US009569390B2

(12) United States Patent
Rudy et al.

(10) Patent No.: US 9,569,390 B2
(45) Date of Patent: Feb. 14, 2017

(54) PROTOCOL FOR COMMUNICATION

(75) Inventors: John Edward Rudy, Escondido, CA (US); An Tonthat, San Diego, CA (US); Patrick Charles Murray, San Diego, CA (US)

(73) Assignee: Combined Conditional Access Development And Support, LLC, San Diego, CA (US)

( * ) Notice: Subject to any disclaimer, the term of this patent is extended or adjusted under 35 U.S.C. 154(b) by 1228 days.

(21) Appl. No.: 13/452,234

(22) Filed: Apr. 20, 2012

(65) Prior Publication Data
US 2013/0282807 A1 Oct. 24, 2013

(51) Int. Cl.
*G06F 15/16* (2006.01)
*G06F 13/38* (2006.01)

(52) U.S. Cl.
CPC .................... *G06F 13/385* (2013.01)

(58) Field of Classification Search
CPC .... G06Q 10/10; H04L 29/06; H04L 29/08072
USPC ......................................................... 709/204
See application file for complete search history.

(56) References Cited

U.S. PATENT DOCUMENTS 6,611,537 B1 * 8/2003 Edens ................ H04L 12/2803
348/E7.05
2007/0220571 A1 * 9/2007 Feng ................... H04L 12/2801
725/111

OTHER PUBLICATIONS

USB 2.0 Specification, "Universal Serial Bus Specification", Revision 2.0, Apr. 2000.*
USB 3.0 Specification, "Universal Serial Bus 3.0 Specification", Revision 1.0, Nov. 2008.*
OpenCable Specifications, "CableCARD Interface 2.0 Specification", Revision 122, Sep. 2010.*

* cited by examiner

*Primary Examiner* — Nicholas Taylor
*Assistant Examiner* — Chong G Kim
(74) *Attorney, Agent, or Firm* — Ballard Spahr LLP

(57) ABSTRACT

Aspects of the disclosure relate to a protocol for communication of information. The protocol can be a non-standard universal serial bus (USB) protocol and can guarantee bandwidth and latency for information communication between a USB host and a single USB device. In one aspect, the non-standard USB protocol can employ a repeating message sequence that is fixed, or static, and preconfigured, the sequence comprising alternating transmission of messages between a first device (e.g., a host device) and a second device (e.g., a peripheral device).

19 Claims, 12 Drawing Sheets

PROTOCOL FOR COMMUNICATION

BACKGROUND

A variety of protocols and related interfaces (e.g., cables and connectors such as IEEE-488 or general purpose interface bus (GPIB); RS-232 interface, universal serial bus (USB); high-definition multimedia interface (HDMI), or the like) are available for communication between electronic devices. Such protocols typically establish the type of data and control signals, and electrical characteristics and timing of such signals. In addition, protocols for communication can specify physical characteristics (such as pin layout) of the interfaces that can permit communication according to the protocols. In certain implementations, for example, peripheral devices, such as CableCARD, can utilize a Personal Computer Memory Card International Association (PCMCIA) interface to provide separate, dedicated full duplex Transport Channel and Data Channel data paths to and from a host device. Such interface generally is costly and thus can preclude widespread utilization of compact, low form factor peripheral devices.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following more detailed description.

The disclosure relates to a protocol for communication of information (e.g., data, signaling, or both). The communication protocol can be a non-standard universal serial bus (USB) protocol and can guarantee bandwidth and latency for information (e.g., data, metadata, and/or signaling) communication between a USB host and a single USB device. The communication protocol (e.g., non-standard USB protocol) can utilize certain aspects of the USB bulk transfer mode, which is typically utilized for data transfer where error correction and recovery is desired, not for guaranteeing bandwidth and latency. In one aspect, the communication protocol can employ a repeating message sequence that is fixed, or static, and preconfigured, the sequence comprising alternating transmission of messages between a first device (e.g., a host device) and a second device (e.g., a peripheral device). In certain implementations, the communication protocol can incur, for example, approximately 14% communication overhead, and can provide about 0.86×480 Mbps=412 Mbps of communication bandwidth, wherein 480 Mbps is the idealized maximum transfer data rate across a USB 2.0 point-to-point interface.

The disclosure provides various advantages when compared to existing technologies for communication according to USB protocol. For example, such embodiments can provide guaranteed bandwidth and latency with reduced complexity and cost with respect to available communication modes (e.g., isochronous mode) in standard USB protocol (as standardized by industry, for example).

Additional aspects or advantages of the subject disclosure will be set forth in part in the description which follows, and in part will be apparent from the description, or may be learned by practice of the subject disclosure. The advantages of the subject disclosure will be realized and attained by means of the elements and combinations particularly pointed out in the appended claims. It is to be understood that both the foregoing general description and the following detailed description are exemplary and explanatory only and are not restrictive of the subject disclosure.

BRIEF DESCRIPTION OF THE DRAWINGS

The annexed drawings are an integral part of the subject disclosure and illustrate exemplary embodiments thereof. Together with the description set forth herein and the claims appended hereto, the annexed drawings serve to explain various principles, features, or aspects of the subject disclosure.

DETAILED DESCRIPTION

Figure 1:
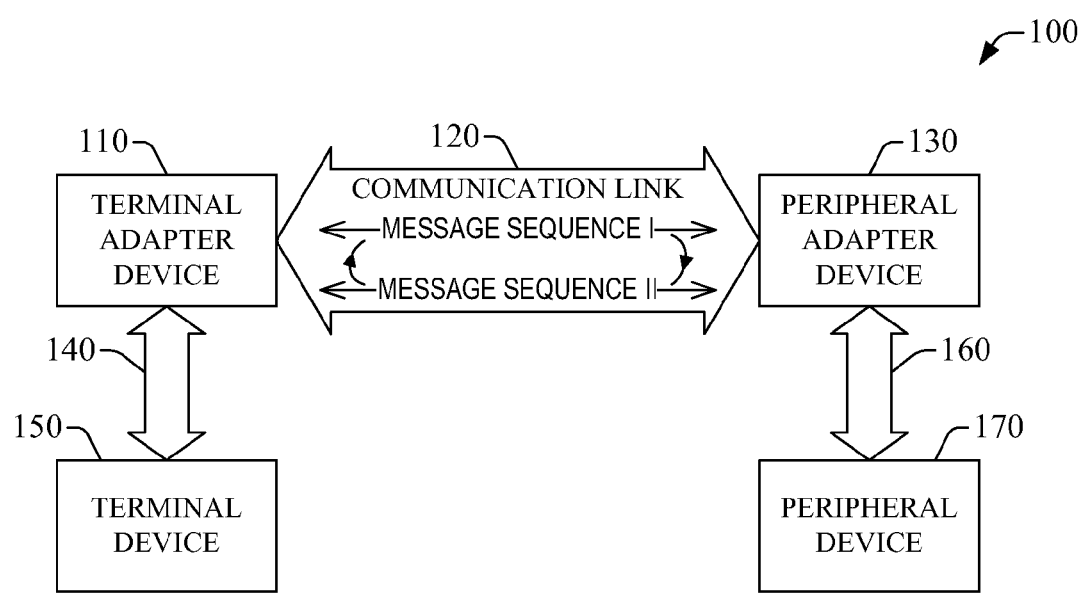
FIG. 1 illustrates an exemplary device configuration for point-to-point communication in accordance with one or more aspects of the disclosure.

The various aspects described herein can be understood more readily by reference to the following detailed description of exemplary embodiments of the subject disclosure and to the annexed drawings and their previous and following description.

Before the present systems, articles, apparatuses, and methods are disclosed and described, it is to be understood that the subject disclosure is not limited to specific systems, articles, apparatuses, and methods for a protocol for communication of information (e.g., data, signaling, or both). It is also to be understood that the terminology employed herein is for the purpose of describing particular, non-exclusive embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "module," "component," "unit," "interface," "platform," "node," and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a system, a layer, a node, an interface, a function, a component, a platform, and the like. It is noted that in certain embodiments, or in connection with certain aspects or features such embodiments, the terms "system," "module," "unit," "component," "interface," "platform" "node," can be utilized interchangeably.

Throughout the description and claims of this specification, the words "comprise," "include," and "having" and their variations, such as "comprising" and "comprises," "include" and "including," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Reference will now be made in detail to the various embodiments and related aspects of the subject disclosure, examples of which are illustrated in the accompanying drawings and their previous and following description. Wherever possible, the same reference numbers are used throughout the drawings to refer to the same or like parts.

The disclosure identifies and addresses, in one aspect, the issue of utilization of transfer modes of standard USB protocol (as standardized or specified by industry, for example) generally requiring the designer of a peripheral device relying on such protocol for communication to make trade-offs in areas such as error detection and recovery, guaranteed bandwidth and latency. Standard USB protocol supports four different types of transfer modes: Control Mode, Interrupt Mode, Bulk Mode, and Isochronous Mode. The Isochronous Mode allows the peripheral device to reserve a defined amount of bandwidth with a guaranteed latency. The isochronous transfer mode generally is utilized for video and audio applications which require a guaranteed data transfer bandwidth and latency. The communication bandwidth of certain interfaces utilized for communication to peripheral devices typically is elevated. For instance, for a CableCARD interface, the bandwidth requirement can be 410 Mbps allocated as follows: 200 Mbps for Transport In, 200 Mbps for Transport Out, 5 Mbps of Data Channel In, and 5 Mbps for Data Channel Out. Such CableCARD communication bandwidth requirement exceeds the capability (e.g., 384 Mbps) of the Isochronous Mode of conventional USB protocol (e.g., USB 2.0). The theoretical maximum transfer data rate across a USB 2.0 point-to-point interface is 480 Mbps. Yet, the overhead for the additional communication protocol traffic that may be necessary to implement standard USB protocol high-speed isochronous endpoints reduces the usable bandwidth for data transfer to a level below the CableCARD application's requirement. In addition, the complexity and cost of implementing the standard USB high-speed isochronous interface message protocol generally is not warranted for dedicated CableCARD point-to-point applications of a USB interface.

As described in greater detail below, the disclosure relates to a non-standard USB protocol for communication of information (e.g., data, signaling, or both). The non-standard USB protocol can guarantee bandwidth and latency for information (e.g., data, metadata, and/or signaling) communication between a USB host and a single USB device. The non-standard USB protocol can utilize certain aspects of the USB bulk transfer mode, which is typically utilized for data transfer where error correction and recovery is desired, not for guaranteeing bandwidth and latency. In one aspect, the non-standard USB protocol can employ a repeating message sequence that is fixed, or static, and preconfigured, the sequence comprising alternating transmission of messages between a first device (e.g., a host device) and a second device (e.g., a peripheral device). In certain implementations, the non-standard USB protocol can incur 14% communication overhead, and can provide about 412 Mbps of communication bandwidth. Certain functional elements of the disclosure can be implemented (e.g., performed) by software, hardware, or a combination of software and hardware. Functional elements of the various embodiments described in the present specification and illustrated in the annexed drawings can be employed in operational environments (access network, telecommunication network, signaling network, etc.) that can include, for example, digital equipment, analog equipment, or both, wired or wireless equipment, etc.

FIG. 1 illustrates an exemplary device configuration 100 for point-to-point communication in accordance with one or more aspects of the disclosure. Such configuration comprises a terminal adapter device 110 functionally coupled (e.g., communicatively coupled) via a communication link 120 (e.g., a serial communication link (or serial link)) to a peripheral adapter device 130. The communication link 120 can be wired or wireless. In one embodiment, the communication link 120 can be a USB cable (e.g., a USB 2.0 cable). The terminal adapter device 110 can be functionally coupled to a terminal device 150 via a link 140, whereas the peripheral adapter device 130 can be functionally coupled to a peripheral device 170 via a link 160. Links 140 and 160 can be wired links or wireless links. In one embodiment, each one of links 140 and 160 can be a PCMIA bus. The terminal device 150 can be referred to as host device and the terminal adapter device 110 can be referred to as host adapter device. In certain embodiments, the terminal device 150 can be customer premises equipment (CPE), such as a set-top box, and the peripheral device can be a multi-stream CableCARD (or M-Card). In other embodiments, the peripheral device can be a conditional access module (CAM). In one aspect, the terminal adapter device 110 can be configured to receive traffic (e.g., transport data) from the terminal device 150 at an instantaneous bandwidth of 216 Mbps (for example, six 200-byte packets received in a period of 7.407 µs).

In certain implementations, the terminal adapter device 110 can be embodied in a first printed circuit board (PCB) assembly and the peripheral adapter device 130 can be embodied in a second PCB assembly. Both of such assemblies can be part of a single PCB embodying the serial interface that permits communication of information (e.g., data, metadata, control data, or combinations thereof) according to the non-standard serial protocol of the disclosure. Terminal adapter device 110 and peripheral adapter device 130 can be energized independently by respective external power supplies (not shown) connected to such devices via respective power jacks. In one aspect, specific power-on sequence(s) for terminal device 150 (or host device 150) and the terminal adapter device 110 can be permitted. For instance, the terminal device 150 and the terminal adapter device 130 both can be powered on, and then the terminal adapter device 110 can be plugged, via at least part of link 140, into the terminal device 150. In another aspect, the terminal adapter device 110 and the peripheral adapter device 130 both are powered on prior to connection of such devices via a USB cable embodying the communication link 120. In yet another aspect, the peripheral adapter device 130 can supply continuous or nearly continuous power to the peripheral device 170 (e.g., an M-Card), which can be functionally coupled to the peripheral adapter device 130 at nearly all times.

Each of the terminal adapter device 110 and the peripheral adapter device 130 can comprise a physical layer (PHY) interface (not shown) that can serve as the interface to a USB port (not shown) that is included in each of such devices and can permit functional connectivity to the communication link 120. The terminal adapter device 110 can include a PHY interface monitor unit (also referred to as interface monitor; not shown) that can detect if the communication link 120 (e.g., a USB cable) has been disconnected. Similarly, the peripheral adapter device 110 can include an interface monitor unit (or interface monitor; not shown) that can detect if the communication link 120 (e.g., a USB cable) has been disconnected.

Each of the terminal adapter device 110 and the peripheral adapter device 130 can be energized independently via external power supplies. In one aspect, after power-on reset, the terminal adapter device 110 can initialize the PHY interface (e.g., a USB UTMI+ Low Pin Interface (ULPI) chipset) therein and thus establish communication among the terminal adapter device 110 and the peripheral adapter device 130. In a scenario in which the communication link 120 is ascertained, by the interface monitor, to be disconnected, the terminal adapter device 110 can re-initialize the PHY interface. In addition or in the alternative, in such scenario, the terminal adapter device 110 can re-establish communication among the terminal adapter device 110 and the peripheral adapter device 130 in response to the communication link 120 being ascertained, by the interface monitor, to be reconnected. In another aspect, after power-on reset, the peripheral adapter device 110 can initialize the PHY interface (e.g., a USB ULPI chipset) therein and thus establish communication among the peripheral adapter device 110 and the terminal adapter device 130. In a scenario in which the communication link 120 is ascertained, by the interface monitor, to be disconnected, the peripheral adapter device 110 can re-initialize the PHY interface. In addition or in the alternative, in such scenario, the peripheral adapter device 110 can re-respond to the re-established communication among the terminal adapter device 110 and the peripheral adapter device 130 in response to the communication link 120 being ascertained, by the interface monitor, to be reconnected. In yet another aspect, in response to the terminal device 150 not applying power to the terminal adapter device 110, the terminal adapter device 110 can tri-state all or substantially all outputs thereof directed to the terminal device 150.

In response to a signal indicative of a reset of a Common Interface (e.g., CI_Reset signal) being asserted (e.g., driven high) by the terminal device 150, data storage, such as traffic buffer(s) or control data buffer(s), in the terminal adapter device 110 can be cleared. In one aspect, a "Placeholder Data" transport message and a "CI Reset to M-Card" data message can be transmitted nearly-continually or continually to the peripheral adapter device 130 while CI_Reset signal is or substantially is asserted. In response to a signal indicative of a reset of a Common Interface (e.g., CI_Reset signal) being asserted (e.g., driven high) by the terminal device 150, data storage, such as traffic buffer(s) or control data buffer(s), in the peripheral adapter device 130 can be cleared.

In certain embodiments, each of the terminal adapter device 110 and the peripheral adapter device 130 can comprise respective status interfaces (e.g., light emitting diode indicators; not shown), each of the respective status interfaces rendering one of more of the following information: (1) USB receive error message; (2) USB time slot connection established; (3) host device transport message sent to PHY interface; (4) device transport message received from the PHY interface; (5) host data channel message sent to the PHY interface; and (6) device data channel message received from the PHY interface.

As described herein, the terminal adapter device 110 is functionally coupled to the terminal device 150 via link 140. In one embodiment in which the link 140 is a PCMCIA interface, the terminal adapter device 110 can operate in the multi-stream mode (M-Mode) of such interface. In response to the terminal device 150 not indicating M-Mode operation, the terminal adapter device 110 can tri-state all or substantially all outputs thereof directed to the terminal device 150. In addition, such device can comprise one or more input/output interfaces that embody or comprise various communication interfaces, such as TP, DC/EDC, CI_Reset, Card Detect, and Vcc interfaces. In one aspect, transport latency through the disclosed serial interface—formed by the terminal adapter device 110, the communication link 120, the peripheral adapter device 130—and the peripheral device 110 can be a predetermined static time plus or minus one transport clock period (e.g., 37 ns). In another aspect, the DC/EDC interface can indicate (in certain exemplary embodiments, indication can be mandatory) readiness for communication (e.g., transmission) with a predetermined period (e.g., five seconds) after the terminal device 150 removes (e.g., drives low) a CI_Reset signal. In yet another aspect, the terminal adapter device 110 can receive an entire DC/EDC message from the terminal device 150 prior to transmitting such message to the peripheral adapter device 130 via the communication link 120. Similarly, in another aspect, the terminal adapter device 110 can receive an entire DC/EDC message from the peripheral adapter 130 prior to transmitting such message to the terminal device 150. In still another aspect, one or more "card detect" signals directed to the terminal device 150 can be asserted (e.g., driven low) in response to (i) the communication link 120 (e.g., USB cable) being functionally coupled (e.g., connected) to the terminal adapter device 110 and/or (ii) communication among the terminal adapter device 110 and the peripheral adapter device 130 being established. The one or more "card detect" signals can remain asserted until about the communication link 120 is decoupled (e.g., disconnected).

The peripheral adapter device 130 can have similar aspects to the foregoing described in connection with the terminal adapter device 110. In one aspect, in the embodiment in which the link 140 is a PCMCIA interface, the peripheral adapter device 110 can operate in the multi-stream mode (M-Mode) of such interface. In addition, such device can comprise one or more input/output interfaces that embody or comprise various communication interfaces and related operation, such as TP, DC/EDC, CI_Reset, and Vpp interfaces. In another aspect, a CI_Reset signal directed to the peripheral device 170 can be asserted (e.g., driven high) in response to (i) the communication link 120 (e.g., a USB cable) being disconnected from the peripheral adapter device 130 or (ii) a "CI_Reset to M-Card" message being received from the terminal adapter device 110. In yet another aspect, the peripheral adapter device 130 can receive an entire DC/EDC message from the peripheral device 170 prior to transmitting such message to the terminal adapter device 130 via the communication link 120. Similarly, in other aspect, the peripheral adapter device 130 can receive an entire message of a message sequence (e.g., message sequence I and/or message sequence II) prior to transmitting such message to the peripheral device 150. In still another aspect, the peripheral adapter device 130 can control (e.g., via a processor in such device or functionally coupled thereto) Vpp1 and Vpp2 signals to initialize the peripheral device 170 in M-Mode of operation and/or to permit CI-interface console connections of the peripheral device 170.

In certain implementations, the serial interface of the disclosure can implement out-of-band (OOB) communication via implementation of a DSG protocol through the DC/EDC interface. The latter, for example, can avoid implementation of an OOB physical interface and thus simplify hardware design and/or operation.

The terminal adapter device 110, the communication link 120, and the peripheral adapter device 130 can form a serial interface (e.g., a USB interface) that can operate in accordance with the non-standard serial protocol described herein. The serial interface can permit, for example, a traffic (or transport) bandwidth of at least 180 Mbps from the terminal adapter device 110 to the peripheral adapter device 130, and at least 180 Mbps from the peripheral adapter device 110 to the terminal adapter device 130. Such bandwidth can enable communication of at least six quadrature amplitude modulation (QAM) signals of order 64 (or 64-QAM), or at least four QAM signals of order 256 (or 256-QAM). In addition or in the alternative, the serial interface can permit, for example, a control (or data) bandwidth of at least 7 Mbps from the terminal adapter 110 to the peripheral adapter device 130. After configuration for communication of the terminal adapter device 110 and the peripheral adapter device 130, communication according to the non-standard serial protocol of the disclosure can comprise a repeating sequence of N fixed length serial messages, the serial messages communicated (e.g., transmitted and/or received) alternately among the terminal adapter device 110 and the peripheral adapter device 130. Here, N is a natural number and can be equal to 2, 4, 8, and so forth. The serial messages can be communicated (e.g., transmitted and/or received) according to the Bulk Mode of the conventional USB protocol, the serial messages being embodied in or comprising bulk mode data messages. The length of a serial message in the repeating sequence of N serial messages (e.g., message sequence I and message sequence II) can be configured to accomplish a predetermined bandwidth requirement. To preserve channel bandwidth, a receiver device—e.g., the peripheral adapter device 130 when receiving a serial message from the terminal adapter 110 or the terminal adapter device 110 when receiving a serial message from the peripheral adapter device 130—can avoid transmission of acknowledgement (ACK) messages in response to reception of a serial message from a transmitter—e.g., the terminal adapter 110 when transmitting a serial message to the peripheral adapter device 130 or the peripheral adapter device 130 when transmitting a serial message to the terminal adapter device 110.

The repeating sequence of N serial messages can be partitioned into two repeating message sequences: Message sequence I and message sequence II. Serial messages in each of such sequences can be transmitted and received alternately. Message sequence I can comprise Q serial messages having a first static length, and message sequence II can comprise P serial messages having a second static length. Here, Q and P are natural numbers greater than unity and Q+P=N. The repeating feature of message sequence I and message sequence II is represented with curved arrow lines in FIG. 1. In other embodiments, more generally, the repeating sequence of N serial messages can be partitioned into a plurality of more than two message sequences, with each sequence in such plurality having a one or more messages.

In one embodiment, the repeating sequence can comprise N=4 serial messages, with (i) Q=2 serial messages embodied in a Transport Message having a first length of 203 bytes and being transmitted from the terminal adapter device 110 to the peripheral adapter device 130, and a Transport Message having the first length and being transmitted from the peripheral adapter device 130 to the terminal adapter device 110; and (ii) P=2 serial messages embodied in Data Message having a second length of 20 bytes and being transmitted from the terminal adapter device 110, and a Data Message having the second length and being transmitted from the peripheral adapter device 130 to the terminal adapter device 110. In one aspect, such embodiment can provide a bandwidth of about $$\left(\frac{400n + 32n}{406n + 40n + 4 \times 13n}\right) \times 480 \text{ Mbps} =$$

$$(1.0000 - 0.1326) \times 480 \text{ Mbps} = 413.386 \text{ Mbps}.$$

Figure 6A:
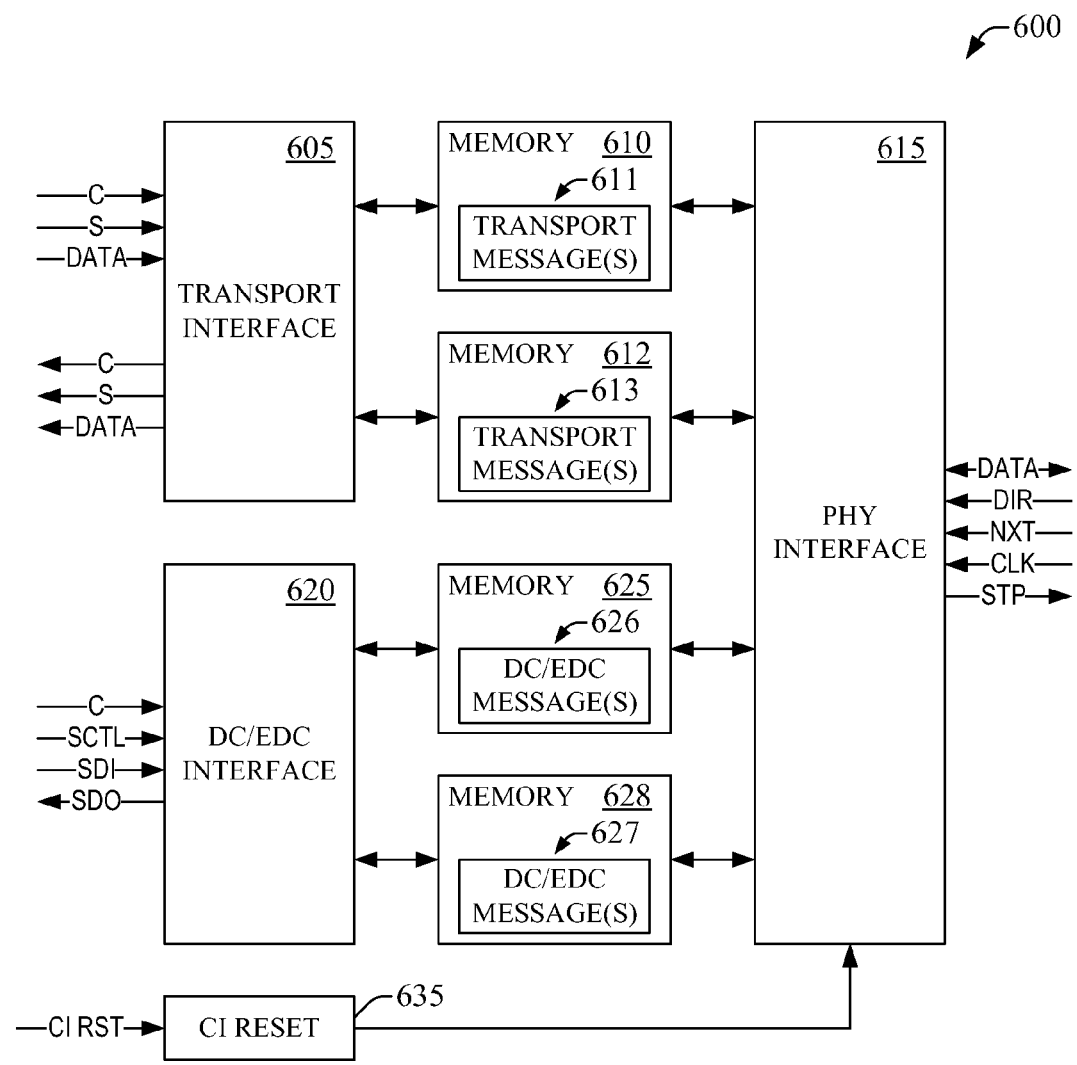
FIGS. 6A-6B illustrate exemplary embodiments of a terminal adapter device and peripheral adapter device in accordance with one or more aspects of the disclosure.
Figure 6B:
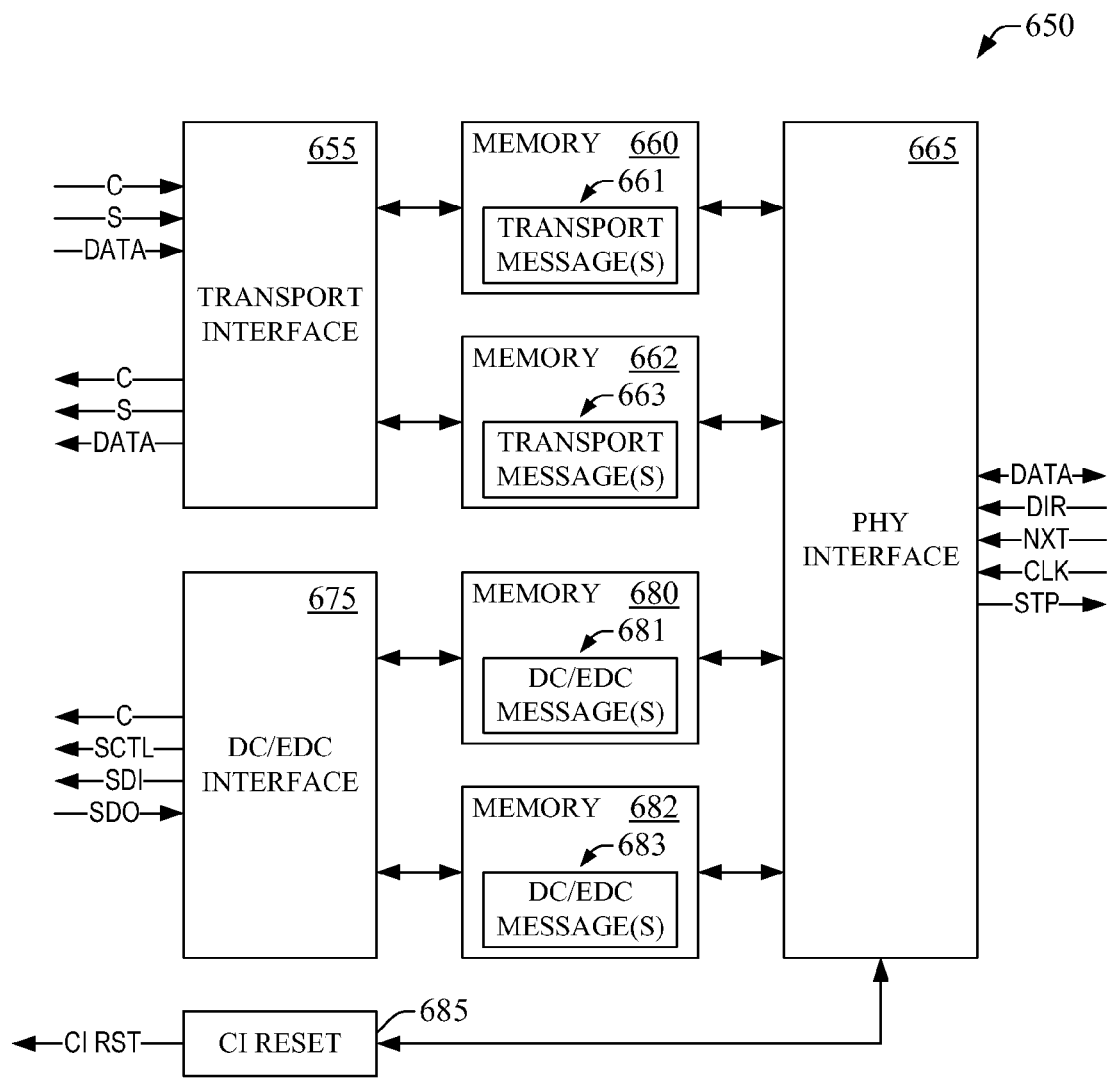

The foregoing resulting bandwidth is determined at least in part by adopting an overhead of 13 clock cycles for USB communication (e.g., transmission of a serial message) and an idealized maximum bandwidth of 480 Mbps for point-to-point USB communication, and considering that communication of a byte is effected on the rising edge of a clock cycle, which is represented with n (a natural number)—see, e.g., FIGS. 6A-6B and related description. The parameter o=0.1326 represents a 13.26% overhead for serial communication and, in one aspect, such parameter can be conservatively approximated to o'=0.14, yielding a conservative estimate of 14% overhead. In such embodiment, a conservative estimate of the bandwidth provided by the disclosed non-conventional serial protocol for Q=2 and P=2, for an overhead o', is 412 Mbps. Accordingly, in another aspect, such embodiment can provide $$\left(\frac{400n}{400n + 32n}\right) \times 480 \text{ Mbps} = 381.481 \text{ Mbps}$$

of bandwidth for traffic (or data information) and $$\left(\frac{32n}{400n+32n}\right) \times 480 \text{ Mbps} = 30.519 \text{ Mbps}$$

of bandwidth for signaling (or control information). The foregoing bandwidths for traffic and control can be approximated, respectively, as follows: 381 Mbps and 31 Mbps, which when combined, yield the net estimated bandwidth of 412 Mbps.

Figures 2, 3:
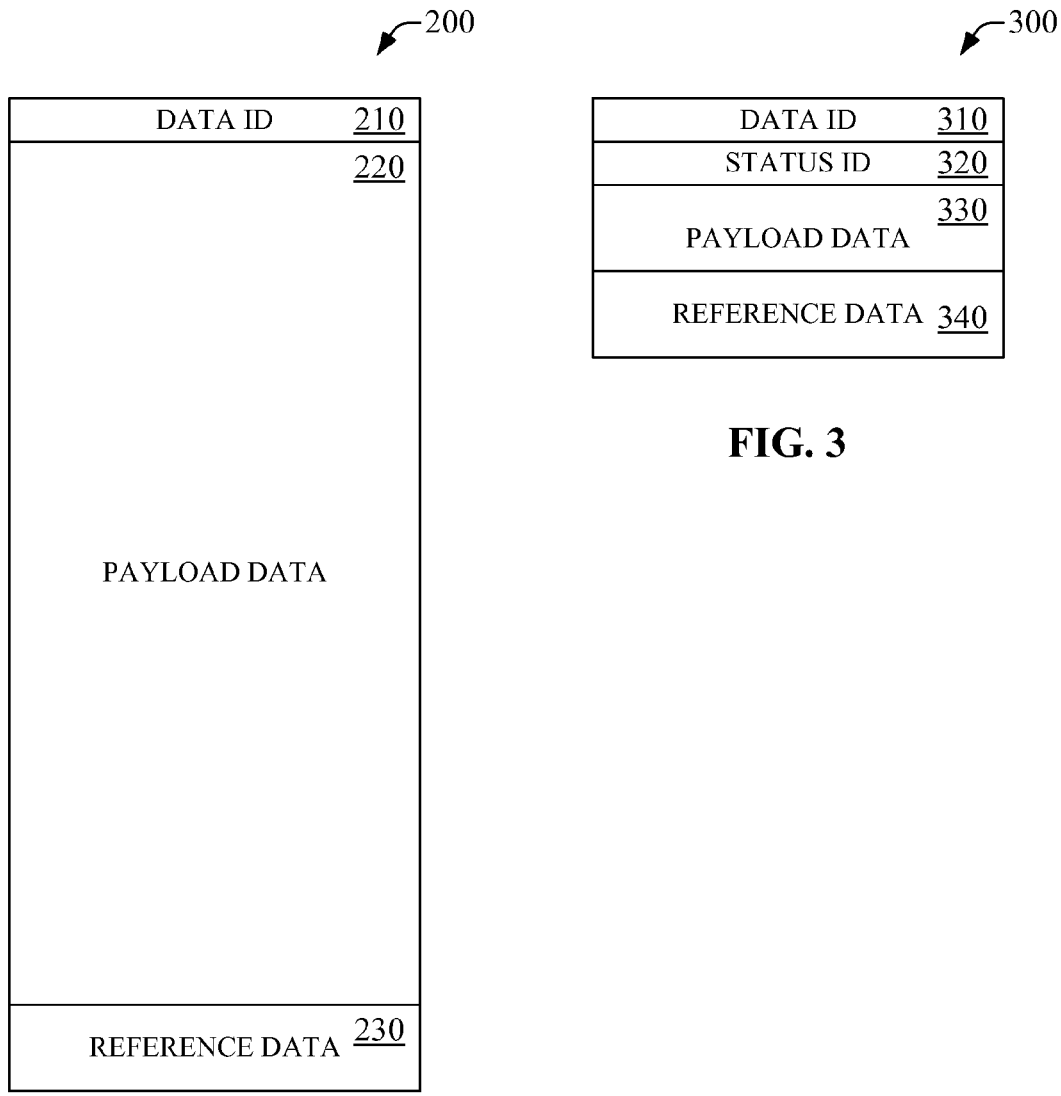
FIGS. 2-3 illustrate exemplary message structures of serial messages in accordance with one or more aspects of the disclosure.

The repeating sequence of serial messages (e.g., message sequence I or message sequence II) exchanged among the terminal adapter device 110 and the peripheral adapter device 130 can have specific structure, as illustrated in FIGS. 2-3. In one aspect, a serial message transmitted from the terminal adapter device 110 to the peripheral adapter device—such message referred to as a "host-to-device" serial message—can have the exemplary message structure 200, which comprises a data identifier (ID) 210, payload data 220, and reference data 230. The payload data 220 can have packet data or placeholder data. In one aspect, the placeholder data can comprise null data (e.g., each byte is 0x00) or other predetermined data not conveying actual traffic. Transmitting placeholder data can ensure bandwidth preservation, among other things. In one implementation of the exemplary message structure 200, the payload data 220 can be embodied in a 200 byte block of information. In another implementation, the reference data 230 can be embodied in a 2 byte block of information and can comprise a cyclic redundancy check (CRC) code. In yet another implementation, the data ID 210 can be embodied in a 1 byte block of information having a packet ID (PID) number. The PID can adopt two values: A first value indicative of the payload data 220 being traffic data (e.g., a "host message contains data" indication), and a second value indicative of the payload data being placeholder data (e.g., a "host message does not contain data" indication).

In another aspect, a host-to-device serial message can have the exemplary message structure 300, which comprises a data ID 310, status ID 320, payload data 330, and reference data 340. Similarly to payload data 220, the payload data 330 can have packet data or placeholder data. Transmitting placeholder data can ensure bandwidth preservation, among other things. In one implementation of the exemplary message structure, the payload data 330 can be embodied in 16 byte block of information. As illustrated, the size ratio of payload data block 330 to payload data block 220 is nearly 0.1. In another implementation, the reference data 230 can be embodied in a 2 byte block of information and can comprise a CRC code. In another implementation, the data ID 310 can be embodied in a 1 byte block of information having a PID number (e.g., 0x3, 0x7, 0xB, 0xF, or the like). As described herein, the PID can adopt two values: A first value indicative of the payload data 330 being traffic data, and a second value indicative of the payload data being placeholder data. In a scenario in which payload data 330 is placeholder data or conveys a common interface (CI) reset directed to the peripheral device 170, such as a "CI to Reset M-Card" message, each byte of the payload data 330 can comprise null data (e.g., each byte is 0x00) or other predetermined data not conveying actual traffic. In yet another implementation, the status ID 320 can be embodied in a 1 byte block of information and can adopt, for example, six values. For a host-to-device serial message, two of the six values can include a first value that can convey "CI to Reset M-Card", and a second value that can convey "Host Is Ready to Receive Data". In addition, the other four values of the six values can be realized in scenarios in which the payload data 330 comprises traffic data, one value of the four values can be "First Data Message of Data Channel/Extended Data Channel (DC/EDC)"; another value of the four values can be "First DC/EDC Message of DC/EDC Transaction"; yet another value of the four values can be "Last DC/EDC Message of the ED/EDC Transaction"; and still another value of the four values can be "DC/EDC Information".

In yet another aspect, a serial message transmitted from the peripheral adapter device 130 to the terminal adapter device 110—such message referred to as a "device to host" serial message—can have the exemplary message structure 200 in accordance with aspects described herein. In one implementation of the exemplary message structure 200, the data ID 210 can be embodied in a 1 byte block of information having a packet ID (PID) number. The PID can adopt two values: A first value indicative of the payload data 220 being traffic data (e.g., a "device message contains data" indication), and a second value indicative of the payload data being placeholder data (e.g., a "device message does not contain data" indication).

In still another aspect, a device to host serial message can have the exemplary message structure 300 in accordance with aspects described herein. For the device to host serial message, the PID can adopt two values: A first value indicative of the payload data 330 being traffic data, such as "device message contains data", and a second value indicative of the payload data being placeholder data, e.g., "device message does not contain data". In a scenario in which payload data 330 is placeholder data, each byte of the payload data 330 can comprise null data (e.g., each byte is 0x00) or other predetermined data not conveying actual traffic. In yet another implementation, the status ID 320 can be embodied in a 1 byte block of information and can adopt, for example, six values. Two of the six values can include a first value that can convey "Set Query Byte Error Bit" and a second value that can convey "Device Is Ready to Receive Data". The other four values of the six values can be realized in scenarios in which the payload data 330 comprises traffic data, one value of the four values can be "First Data Message of DC/EDC"; another value of the four values can be "First DC/EDC Message of DC/EDC Transaction"; yet another value of the four values can be "Last DC/EDC Message of the ED/EDC Transaction"; and still another value of the four values can be "DC/EDC Information".

In the disclosed non-standard serial protocol, in one aspect, unless the terminal adapter device 110 receives a serial message with a status ID 320 indicative of "Device Is Ready to Receive Data", the terminal adapter device 110 can withhold, or otherwise avoid, transmission of a serial message (e.g., a Data Message) containing DC/EDC data to the peripheral adapter device 130. In another aspect, in response to transmitting a serial message having a status ID indicative of "Host Is Ready to Receive Data", the terminal adapter device 110 can withhold, or otherwise avoid, transmission of a serial message indicative of the terminal adapter device 110 not being ready to receive data until after (a) the terminal adapter device 110 has received a serial message (e.g., a Data Message) from the peripheral adapter device 130 or (b) the terminal adapter device 110 transmits a serial message conveying a status ID 320 indicative of "CI reset to M-Card". In yet another aspect, the terminal adapter device 130 can assess (e.g., decode) the value of reference data 340 for serial messages received from the peripheral adapter device 130 and having the exemplary message structure 300. In a scenario in which the reference data 340 conveys a CRC value indicative of an error, the terminal adapter device 110 can clear a DC/EDC message data previously received and can remain on hold until receiving a subsequent "first" Data Message, thus discarding the DC/EDC message that contained the CRC value indicative of error.

In addition or in the alternative, in the disclosed non-standard serial protocol, in one aspect, unless the peripheral adapter device 130 receives a serial message with a status ID 320 indicative of "Host Is Ready to Receive Data", the peripheral adapter device 130 can withhold, or otherwise avoid, transmission of a serial message (e.g., a Data Message) containing DC/EDC data to the terminal adapter device 110. In another aspect, in response to transmitting a serial message having a status ID indicative of "Device Is Ready to Receive Data", the peripheral adapter device 130 can withhold, or otherwise avoid, transmission of a serial message indicative of the peripheral adapter device 130 not being ready to receive data until after the peripheral adapter device 130 has received a serial message (e.g., a Data Message) from the terminal adapter device 110. In yet another aspect, the peripheral adapter device 130 can assess (e.g., decode) the value of reference data 340 for serial messages received from the terminal adapter device 110 and having the exemplary message structure 300. In a scenario in which the reference data 340 conveys a CRC value indicative of an error, the peripheral adapter device 130 can clear a DC/EDC message data previously received and can remain on hold until receiving a subsequent "first" Data Message, thus discarding the DC/EDC message that contained the CRC value indicative of error.

Figure 4:
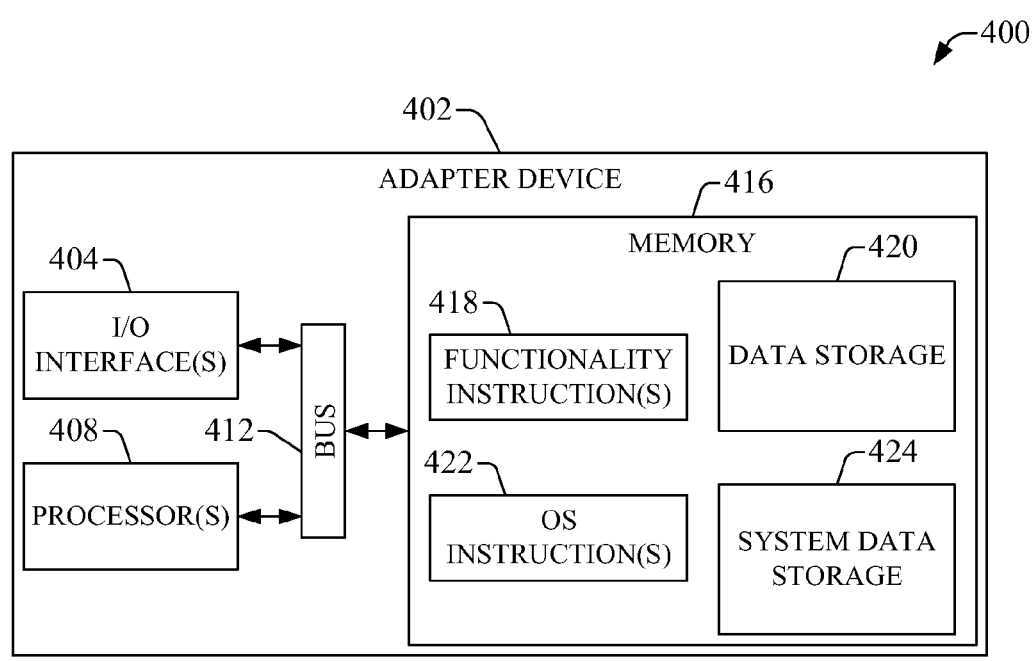
FIGS. 4 and 5A-5B illustrate exemplary embodiments of adapter devices in accordance with one or more aspects of the disclosure.

FIG. 4 is a block diagram of an exemplary embodiment 400 of an adapter device 402 in accordance with one or more aspects of the disclosure. The adapter device 402 is a device that can embody a terminal adapter device (such as device 110) or a peripheral adapter device (such as device 130). In the illustrated embodiment, the adapter device 402 comprises a group of one or more I/O interfaces 404, a group of one or more processors 408, a memory 416, and a bus 412 that functionally couples (e.g., communicatively couples) two or more of the functional elements of the adapter device 402, including the group of one or more processor(s) 408 to the memory 416. The adapter device 402 can have various physical embodiments of disparate form factors. A suitable form factor can be determined at least in part by power consumption (net power, power density, etc.), integration (or packaging) requirements for functional components of the adapter device 402, and so forth. As an example, the adapter device 402 can be implemented in a PCB assembly.

In one implementation, the functionality of adapter device 402 can be configured by a group of computer-executable instructions (e.g., programming code instructions or programming modules) that can be executed by at least one processor of the one or more processors 408. Such implementation can be referred to as a software-based functionality implementation. Generally, programming modules can comprise computer code, routines, objects, components, data structures (e.g., metadata objects, data objects, control objects), and so forth, that can be configured (e.g., coded or programmed) to perform a particular action or implement particular abstract data types in response to execution by the at least one processor. For example, a first group of computer-executable instructions can configure logic that, in response to execution by the at least one processor, can enable the adapter device 402 to operate as a terminal adapter device or a peripheral device adapter. In another implementation, functionality of adapter device 402 can be configured through programmable hardware design, wherein, for example, a processor of the one or more processors 408 can be programmed to perform certain actions that yield such functionality. Such implementation can be referred to as a firmware-based functionality implementation.

Data and computer-accessible instructions, e.g., computer-readable instructions and computer-executable instructions, associated with specific functionality of the adapter device 402 can be retained in memory 416. Such data and instructions can permit implementation, at least in part, of the latency-based routing, and related load balancing, of queries in accordance with one or more aspects of the disclosure. In one aspect, the computer-accessible instructions can embody any number of programming code instructions or program modules that permit specific functionality. In the subject specification and annexed drawings, memory elements are illustrated as discrete blocks. However, such memory elements and related computer-accessible instructions and data can reside at various times in different storage elements (flip-flop, latches, registers, buffers, memory pages, files, databases, memory addresses, etc.; not shown) in memory 416.

Figure 5A:
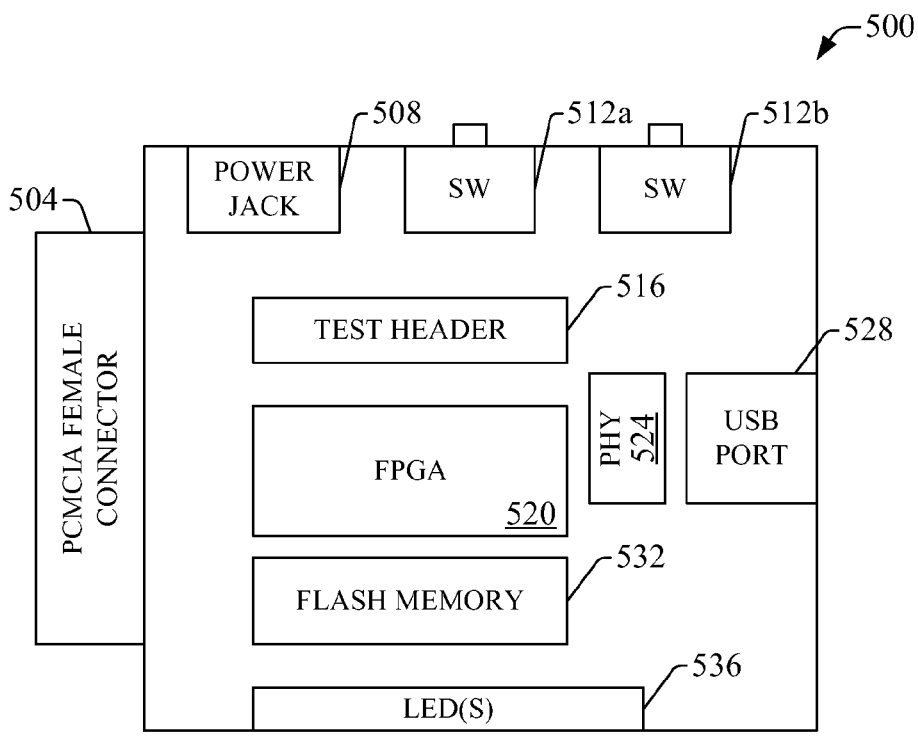
Figure 5B:
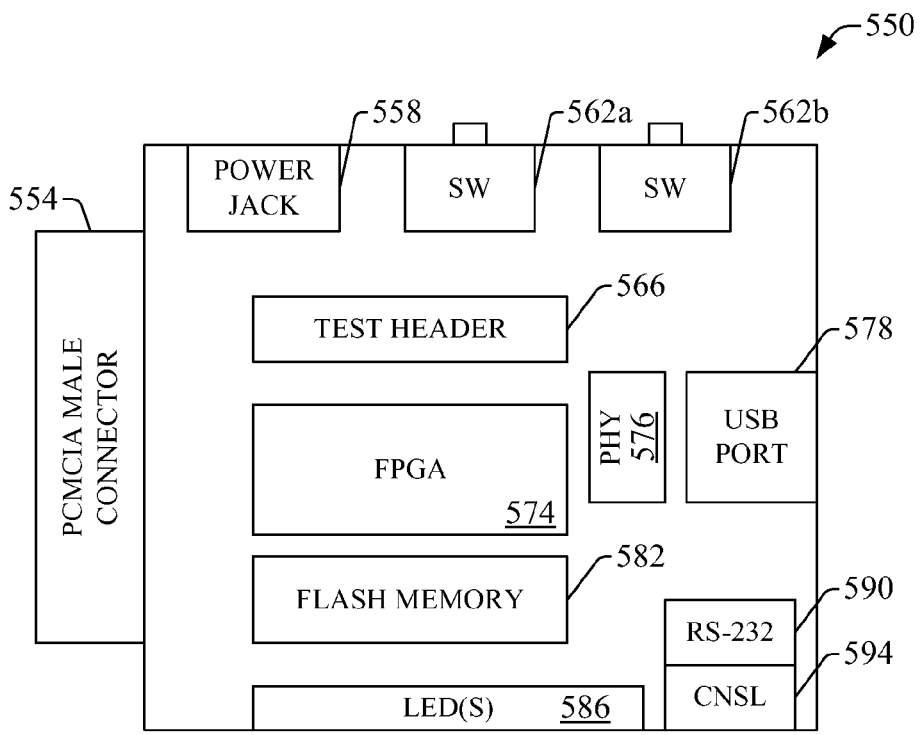

As illustrated, data storage 420 can be part of memory 416 and can comprise a variety of data, metadata, or both, associated with the non-standard serial protocol communication in accordance with aspects described herein. As an illustration, in an exemplary implementation in which the adapter device 402 can embody a terminal adapter device, e.g., terminal adapter device 500 shown in FIG. 5A, such terminal device can include data storage as part of a memory, e.g., flash memory 532. As another illustration, in another exemplary implementation in which the adapter device 402 can embody a peripheral adapter device, e.g., peripheral adapter device 550 shown in FIG. 5B, such peripheral adapter device can include data storage as part of a memory, e.g., flash memory 582.

Memory 416 also can comprise one or more computer-executable instructions for implementation of specific functionality of the adapter device 402 in connection with the disclosed non-standard serial protocol for communication. Such computer-executable instructions can be retained as memory element labeled functionality instruction(s) 418. In one aspect, as described herein, the functionality instruction(s) 418 can be stored as an implementation (e.g., a compiled instance) of one or more computer-executable instructions that implement, and thus provide, at least the functionality of the methods described herein. The functionality instruction(s) 418 also can be transmitted across some form of computer readable media. It should be appreciated that different functionality instruction(s) can render physically alike adapter devices into functionally different components (e.g., terminal adapter device or peripheral adapter device), with functional differences dictated by logic (e.g., computer-executable instructions and data) specific to each one of such adapter devices and defined by the functionality instruction(s) 418.

Memory 416 can be embodied in a variety of computer-readable non-transitory storage media. Exemplary computer-readable media can be any available media that is accessible by a processor in a computing device, such as one processor of the group of one or more processors 408, and can comprise, for example, both volatile and non-volatile media, removable and non-removable media. As an example, computer-readable media can comprise "computer storage media," or "computer-readable storage media," and "communications media." Such storage media can be non-transitory storage media. "Computer storage media" comprise volatile and non-volatile, removable and non-removable media implemented in any methods or technology for storage of information such as computer readable instructions, data structures, program modules, or other data. Exemplary computer storage media can comprise one or more of random-access memory (RAM), synchronous dynamic random-access memory (SDRAM) read-only memory (ROM), electrically erasable programmable read-only memory (EEPROM), flash memory (e.g., flash memory 532 or flash memory 582) or other memory technology, CD-ROM, digital versatile disks (DVD) or other optical storage, magnetic cassettes, magnetic tape, magnetic disk storage or other magnetic storage devices, or any other medium which can be utilized to store the desired information and which can be accessed by a computer or a processor therein or functionally coupled thereto.

In certain implementations—such as implementations of higher complexity—memory 416 can be partitioned into a system memory (not shown) that can contain data and/or programming modules that enable essential operation and control of the adapter device 402. Such programming modules can be implemented (e.g., compiled and stored) in memory element 422, referred to as operating system (OS) instruction(s) 422, whereas such data can be system data that is retained in memory element 424, referred to as system data storage 424. The OS instruction(s) 422 and system data storage 424 can be immediately accessible to and/or are presently operated on by at least one processor of the group of one or more processor(s) 408. The OS instructions 422 can embody an operating system for the adapter device. Specific implementation of such OS can depend in part on architectural complexity of the adapter device 402. Higher complexity affords higher-level OSs. Example operating systems can include Unix, Linux, iOS, Windows operating system, and substantially any operating system for a computing device. In certain scenarios, the operating system embodied in OS instruction(s) 422 can have different levels of complexity based on particular configuration of the adapter device 402.

Memory 416 can comprise other removable/non-removable, volatile/non-volatile computer-readable non-transitory storage media. As an example, memory 416 can include a mass storage unit (not shown) which can provide non-volatile storage of computer code, computer readable instructions, data structures, program modules, and other data for the adapter device 402. A specific implementation of such mass storage unit (not shown) can depend on desired form factor of the adapter device 402, and space available for deployment thereof. For suitable form factors and sizes of the adapter device 402, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, RAM(s), SDRAM(s), ROM(s), EEPROM(s), or the like.

In certain embodiments, features of the non-standard serial protocol for communication in accordance with aspects described herein can be performed, at least in part, in response to execution of software component(s) by a processor of the group of one or more processors 408. The software components can include one or more implementations (e.g., coded, linked, and/or, compiled instance(s)) of functionality instruction(s) 418.

In general, a processor of the group of one or more processors 408 can refer to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the group of one or more processor(s) 408 can refer to an integrated circuit with dedicated functionality, such as an application specific integrated circuit (ASIC), a digital signal processor (DSP), a field programmable gate array (FPGA), a complex programmable logic device (CPLD), a discrete gate or transistor logic, discrete hardware components, or any combination thereof designed to perform the functionality described herein. As an example, in the exemplary terminal adapter device 500, an FGPA 520 embodies the group of one or more processors 408. The flash memory 532 can be the image flash memory of the FPGA 520. The FPGA 520 can embodied in a Xilinx Spartan 3E FPGA or an Altera FPGA. As another example, in the exemplary terminal adapter device 500, an single FGPA 574 embodies the group of one or more processors 408. The flash memory 582 can be the image flash memory of the FPGA 574. The FPGA 574 can embodied in a Xilinx (e.g., Xilinx Spartan 3E FPGA) or an Altera FPGA. In one aspect, processors referred to herein can exploit nano-scale architectures such as, molecular and quantum-dot based transistors, switches and gates, in order to optimize space usage (e.g., improve form factor) or enhance performance of the computing devices that can implement the various aspects of the disclosure. In another aspect, the one or more processor(s) 408 can be implemented as a combination of computing processing units.

The one or more input/output (I/O) interfaces 404 can functionally couple adapter device 402 to another functional element (component, unit, etc.) either external to the adapter device 402 (such as another adapter device) or internal to the adapter device 402. At least one I/O interface of the one or more I/O interfaces 404 can enable delivery of output (e.g., output data and/or output signaling) to such functional element. Such output can represent an outcome or a specific action of one or more actions described herein, such as in the methods of FIGS. 7-12. In one aspect, the one or more I/O interface(s) 404 can include at least one port, or connector, that can permit connection of the adapter device 402 to other functional elements. In one aspect, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like. As an illustration, the exemplary terminal adapter device 500 comprises a PCMCIA female connector 504; a power jack 508 that can permit connection with an external power supply; a USB port 528 (or USB connector 528) than can permit connection with a peripheral adapter device (e.g., device 550) via a serial link (e.g., communication link 120) coupled to the terminal adapter device; a PHY interface 576 that serves as the interface to the USB port 528; and a PHY interface 524 that serves as the interface to the USB port 528. The PHY interface 524 can be embodied in a Smart Mixed-Signal Connectivity™ (SMSC) USB3300 UTMI+ Low Pin Interface (ULPI) chipset (with 32 pin QFN), or a ST Ericsson ISP1507 ULPI high-speed transceiver chipset. As another illustration, the exemplary peripheral adapter device 550 comprises a PCMCIA male connector 554; a power jack 558; a USB port 578 (or USB connector 578) that enables connection to a terminal adapter device (e.g., device 500) via a serial link (e.g., communication link 120) coupled to the terminal adapter device; a PHY interface 576 that serves as the interface to the USB port 578; and an RS-232 level shifting chipset 590 and associated serial console (CNSL) connector 594. Functional elements 590 and 594 can permit serial console coupling to a peripheral card with CI console-mode functionality. The PHY interface 524 can be embodied in a SMSC USB3300 ULPI chipset (with 32 pin QFN), or a ST Ericsson ISP1507 ULPI high-speed transceiver chipset.

In another aspect, the one or more I/O interfaces 404 can comprise a chip-to-chip communicative coupling interface, such as a media independent interface (MII) or a test interface. In certain scenarios, the test interface can be utilized to convey output(s) from a processor of the one or more processors 408. In the terminal adapter device 500, the test interface can embody or comprise test header interface 516 (also referred to as test header 516), and in the peripheral adapter device 550 the test interface can embody or comprise test header interface 566 (also referred to as test header 566). In one aspect, test header 516 or test header 566, or both, can be chipsets having architectures (e.g., standard test access port and boundary-scan architecture) consistent with the Joint Test Action Group (JTAG) standard.

In yet another aspect, the one or more I/O interfaces 404 can include at least one switch (e.g., a push switch) that can enable triggering application of certain signal(s) (e.g., a voltage) for a predetermined period to the adapter device 402. For example, the exemplary terminal adapter device 500 comprises switches 512a-512b and the exemplary peripheral adapter device 550 comprises push switches 562a-562b. In one implementation, switch 512a can be a push-button switch that can allow FPGA load reset of FPGA 520, and switch 512b can be a push-button switch that can allow FPGA logic reset. In another implementation, switch 562a can be a push-button switch that can allow FPGA load reset of FPGA 574, and switch 562b can be a push-button switch that can allow FPGA logic reset of FPGA 574.

In still another aspect, the one or more I/O interface(s) 404 can include at least one indicator, e.g., a functional element that renders visual or aural indicia to convey operational status of the adapter device 402. For example, the exemplary terminal adapter device 500 comprises one or more light emitting diodes (LEDs) 536 embodying a status interface, and the exemplary peripheral adapter device 550 comprises one or more LEDs 586 embodying a status interface. In one implementation, LED(s) 536 can comprise respective LEDs indicative of the following: (1) CI_Reset signal from a terminal device (e.g., terminal device 150); (2) communication link 120 (e.g., USB cable) connected; (3) message sequence I and message sequence II being exchanged; (4) transport message sent to the PHY interface 524 from the terminal device; (5) DC/EDC message sent to the PHY interface 524 from the terminal device; (6) transport message received from the PHY interface 524 from a peripheral device (e.g., device 170); (7) DC/EDC message received from the PHY interface 524 from the peripheral device; (8) PCB Power status; and (9) load status of flash memory 532 (e.g., FPGA memory image). In another implementation, LED(s) 586 can comprise respective LEDs indicative of the following: (A) CI_Reset signal to a peripheral device (e.g., peripheral device 170); (B) communication link 120 (e.g., USB cable) connected; (C) message sequence (e.g., message sequence I and message sequence II) being exchanged; (D) transport message received from the PHY interface 524 from a terminal device (e.g., terminal device 150); (E) DC/EDC message received from the PHY interface 576 from the terminal device; (F) transport message sent to the PHY interface 524 from the peripheral device; (G) DC/EDC message sent to the PHY interface 524 from the peripheral device; (H) PCB Power status; and (I) load status of flash memory 532 (e.g., FPGA memory image).

In certain implementations in which the adapter device 402 has suitable resources, such as sufficient memory to retain computer-accessible instructions embodying one or more I/O interfaces, functionality of the adapter device 402 that is associated with data I/O or signaling I/O can be accomplished in response to execution, by a processor of the group of one or more processors 408, of at least one of the one or more I/O interfaces. In such implementations, the one or more I/O interfaces can be retained in a memory element (not shown) that can be part of memory 416 or can be a dedicated memory element (not shown) external to memory 416. In one aspect, the at least one I/O interface can embody or comprise an API that permit exchange of data or signaling, or both, via an I/O interface of I/O interface(s) 404.

Bus 412 represents one or more of several types of bus structures and/or other connectivity structures, comprising a memory bus or memory controller; a peripheral bus; an accelerated graphics port; a processor or local bus using any of a variety of bus architectures; traces; vias; or any combination of the foregoing. As an example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a PCMCIA bus, Universal Serial Bus (USB), and the like.

FIGS. 6A-6B are block diagrams of exemplary embodiments 600 and 650 of a terminal adapter module that can be part of a terminal adapter device 110 and a peripheral adapter module that can be part of a peripheral adapter device 130, respectively, in accordance with one or more aspects of the disclosure. In certain implementations, such modules can be distributed between a processor (e.g., FPGA 520 or FPGA 574) and a memory (e.g., flash memory 532 or flash memory 582) of the respective devices having such modules. The exemplary embodiment 600 comprises a CI reset unit 635 (also referred to as CI reset 635). The CI reset 635 can provide a CI reset state to the PHY interface 615 for generation of a "CI Reset To M-Card" message status to peripheral device 130, as described herein. The CI reset 635 can reset transport functions and/or data channel function of the terminal device adapter. In one aspect, the CI reset state can be provided via a CI reset signal (CI RST) that can be sourced by a system control unit (not shown) comprising the CI reset 635. In another aspect, the exemplary embodiment 600 can have a reset (e.g., CI RST) asynchronously asserted and synchronously de-asserted to a system clock domain, a transport clock domain, and/or a data channel clock domain. In one implementation, the system control unit (not shown) comprising the CI reset 635 can supply, for example, a 60 MHz clock signal (e.g., signal labeled "CLK") to the PHY interface 615. Other clock signals at different frequencies also can be supplied. As illustrated, various serial (e.g. USB 2.0 or ULPI+) interface signals can be received at and/or transmitted from the PHY interface 665. In one aspect, data signal (labeled "DATA") can comprise bi-directional traffic received and transmitted via a multi-bit (e.g., 8-bit) bus, such as an implementation of bus 412. In another aspect, three control signals can be associated with the PHY interface 615: (i) an incoming signal, labeled "DIR", that can be asserted (e.g., asserted high) by the PHY interface 615 to control the data bus and determine direction thereof; (ii) an incoming signal, labeled "NXT", that can be driven high to signal the data bus is to be throttled; and (iii) an outgoing signal that can be driven high to signal the end of a data stream transmitted to the PHY interface 615, or signal a request for data bus access.

The exemplary device can comprise a transport interface 605 that can receive host transport packets (e.g., traffic packets; represented with an incoming arrow labeled "Data") from a host, such as terminal device 150, and can transmit such packets to a memory 610 (e.g., a transport input packet buffer). In addition, the transport interface 605 can receive peripheral device transport packets (e.g., traffic packets) from a memory 612 (e.g., a transport output packet buffer) and transmit such packets to the host. In one aspect, the transport interface 605 can clock in a host transport packet on the rising edge of a transport clock (C) signal. In another aspect, the transport interface 605 can clock out device transport packets on the rising edge of a transport clock (C) signal.

As illustrated, the memory 610 (e.g., the transport input packet buffer) can receive host transport packets (e.g., traffic packets, represented as transport message(s) 611) from the transport interface 605. In one aspect, the memory 610 (e.g., the transport input packet buffer) can monitor a start pulse to detect and/or discard short transport packets. In another aspect, the memory 610 can time stamp at least one (e.g., one, two, more than two, each) host transport packets with a two-byte time stamp. In one implementation, the time stamp can be inserted into the pre-header's CableCARD reserved field and, in response, a pre-header's reference data (e.g., CRC-8) field can be regenerated.

In certain implementations, the memory 610 (e.g., the transport input packet buffer) can be configured to buffer eight host transport packets, and can be a 2 KB first-in-first-out (FIFO) buffer. In one aspect, such buffer can be written in the transport clock domain and can be read in the system clock domain. In another aspect, the memory 610 can signal the PHY interface 620 when (e.g., upon or after) a host transport packet is available for communication. Similarly, in yet another aspect, the memory 610 (e.g., the transport input packet buffer) can receive signaling from the PHY interface 620 to transmit a host transport packet during an allocated USB transmit timeslot. In one implementation, the PHY interface 615 can flow control a host transport packet on a byte basis. In one aspect, the memory 612 (e.g., transport output packet buffer) can receive signaling from the PHY interface 615 when a device transport packet is available during a USB receive timeslot. In one implementation, the PHY interface 620 can flow control a device transport packet on a byte basis.

In certain implementations, the memory 612 (e.g., the transport output packet buffer can receive RxError status and reference data (e.g., CRC-16) error status from the PHY interface 615 during a USB receive timeslot when (e.g., upon or after) such slot contains a device transport packet. In one aspect, the memory 612 (e.g., the transport output packet buffer) can discard a device transport packet having an RxError or a device transport packet having a reference data (e.g., CRC-16) error device transport packets.

In one implementation, the memory 612 (e.g., the transport output packet buffer) can be configured to buffer eight device transport packets, and can be embodied in a 2 KB FIFO for device transport packets and a 16 byte FIFO for time stamps. In one aspect, such buffer can be written in a system clock domain and can be read in a transport clock domain.

Similarly to the memory 610 (e.g., transport input packet buffer), the memory 612 (e.g., transport output packet buffer) can generate a two-byte time stamp expired count. In one aspect, the memory 612 (e.g., transport output packet buffer) can determine when a time stamp of a device transport packet has expired to determine when to transmit the device transport packet to the transport interface 605. Delivering the device transport packet in response to expiration of a time stamp can yield a fixed latency for transport packets communicated through the non-standard serial protocol for communication described herein.

As illustrated, the exemplary embodiment 600 comprises a DC/EDC interface 620, which can be a device data channel interface. The DC/EDC interface 625 can receive a host data channel message from a host, such as peripheral device 150, and can transmit such message to a memory 625 (e.g., data channel input message buffer) which, in turn, can receive the host data channel message from the DC/EDC interface 620. Host data channel message(s) can be retained in memory 625 as DC/EDC message(s) 626. In one aspect, the memory 625 (e.g., the data channel input message buffer) can signal the DC/EDC interface 620 when (e.g., upon or after) the memory 625 is ready to receive data. Host data channel messages can be signaling packets and are represented with an incoming arrow labeled "SDI" (serial data input). In one aspect, the DC/EDC interface 625 can clock in a host data channel message on the rising edge of the data channel clock (C) signal.

In certain implementations, the DC/EDC interface 625 can receive device data channel messages (e.g., DC/EDC message(s) 627) from the memory 628 (e.g., the data channel output message buffer), and can transmit such messages (represented with an outgoing arrow labeled "SDO" (serial data output)) to a host device (e.g., peripheral device 150). In one aspect, the DC/EDC interface 625 can clock out a device data channel message on the falling edge of a data channel clock (C) signal.

In one implementation, the memory 625 (e.g., the data channel input message buffer) can be configured to buffer one host data channel message having up to 4 KB of data and the length and status information of the host data channel message. Such buffer can be written in the data channel clock domain and will be read in the system clock domain.

The memory 625 (e.g., the data channel input message buffer) can signal the PHY interface 620 when a complete host data channel message is available for transmission. Similarly, the memory 625 can receive signaling from the PHY interface 615 to send a host message segment during a USB transmit timeslot. In one implementation, the PHY interface 620 can flow control the host message segment on a byte basis.

The memory 628 (e.g., the data channel output message buffer) can receive signaling from the PHY interface 620 that a device message segment is available during a USB receive timeslot. Similarly to the control of host messages, the PHY interface 615 can flow control a device message segment on a byte basis. The memory 628 (e.g., the data channel output message buffer) can signal the PHY interface 615 when (e.g., upon or after) the memory 628 is ready to receive data. In addition or in the alternative, the memory 628 (e.g., data channel output message buffer) can transmit device data channel messages to the data channel interface. Moreover or as another alternative, the data channel output message buffer can inform the data channel interface when a complete device data channel message is available.

Similarly to the memory 612, in certain implementations, the memory 628 (e.g., the data channel output message buffer) can receive RxError status and reference data (e.g., CRC-16) error status from the PHY interface 615 during a USB receive timeslot when the PHY interface 615 contains a device message segment. The memory 628 (e.g., data channel output message buffer) can discard device data channel messages having RxError and/or CRC-16 error. In additional or alternative implementations, the data channel output message buffer can be configured to buffer one device data channel message with up to 4 KB of data along with length and status information of such message. The buffer will be written in the system clock domain and will be read in the data channel clock domain.

The PHY interface 615 can route (e.g., transmit directly or indirectly) data and/or control among the USB PHY and the transport, data channel, and/or reset units of the terminal adapter device embodied in the exemplary embodiment 600. The PHY interface 620 can initialize a USB PHY (e.g., PHY 524) synchronous, hi-speed host operation at initialization time. In response to the USB PHY being initialized, the PHY interface 620 can establish communication with a peripheral adapter device (e.g., device 130) upon or after the peripheral adapter device is connected to the terminal adapter device embodied in exemplary embodiment 600. In one aspect, USB synchronous, hi-speed communication can be established between the terminal adapter device and the peripheral adapter device via "USB TimeSlot Connection".

The PHY interface 620 can generate transport transmit messages as described herein (e.g., FIG. 2). In one aspect, generation of such messages can comprise generation of a data ID (e.g., data ID 210) and reference data (e.g., data 230) and assembly of such information into a ULPI transport transmit message having payload data originated from a host device, such as a terminal device 150). The PHY interface 620 can generate a data ID field and a reference data field of transport transmit messages. In one implementation, the data ID can be information in TX CMD field and the reference data can be CRC information (e.g., 17 bit CRC information (or CRC-16)). Accordingly, in one aspect, the PHY interface 620 can generate a TX CMD field to contain the TX CMD information and a CRC-16 field to contain the CRC-16 information. In connection with payload data (e.g., data 220), the PHY interface 620 can generate ULPI transport transmit messages having host transport packets if a host transport packet is available and having dummy (e.g., null) data if a host transport packet not being available.

The PHY interface 620 can generate data transmit (TX) messages as described herein (e.g., FIG. 3). In one aspect, generation of such messages can comprise generation of a data ID (e.g., data ID 310) and reference data (e.g., data 340) and assembly of such information into a ULPI data transmit message having payload data originated from a host device, such as a terminal device 150). The PHY interface 620 can generate a data ID field, a status ID field, and a reference data field of ULPI transport transmit messages. In one implementation, the data ID can be information in TX CMD field and the reference data can be CRC information (e.g., 17 bit CRC information (or CRC-16)). Accordingly, in one aspect, the PHY interface 620 can generate the TX CMD and CRC-16 fields of data transmit messages. In connection with payload data (e.g., data 220), the PHY interface 620 can generate ULPI data transmit messages having host data channel message data if a host data channel message is available and having dummy data if a host data channel message is unavailable.

Regarding the status ID field, in one aspect, the PHY interface 620 can insert the state of a query byte ER bit of a peripheral device interface into the "Set Query Byte Error Bit" field of a status ID byte into a data transmit message. In another aspect, the PHY interface can insert the state of the readiness of memory 628 (the data channel output message buffer) to receive data into the "Host is Ready To Receive Data" field of the status byte in a data transmit message. In yet another aspect, The PHY interface will insert the state of CI reset into the "CI Reset To M-Card" field of the status byte in all ULPI data transmit messages.

The PHY interface 620 can receive (e.g., decode, disassemble) transport receive messages in accordance with aspects described herein. In one aspect, the PHY interface 620 can transmit received device transport packets to the memory 628 (transport output packet buffer). Similarly, the PHY interface 620 can receive (e.g., decode, disassemble) data receive messages. In one aspect, the PHY interface 620 can transmit a received device message segments to the data channel output message buffer.

The PHY interface 620 can monitor information (e.g., data messages, transport messages, or the like) for status of various quantities related to communication in accordance with the non-standard USB protocol described herein. For example, the PHY interface 620 can monitor one or more of PID Error, RxError, CRC-16 Error, Device Query Byte Error Bit, Device is Ready To Receive Data, and HostDisconnect.

In one aspect, PID Error can be either a PID check field not the one's complement of the PID field or received non-defined PID. The PHY interface can discard receive messages having PID Error. In another aspect, RxError and/or reference data (e.g., CRC-16) error status can be sent to the transport and data channel output message buffers to discard error'ed device transport packets and device data channel messages. In another aspect, "Device Query Byte Error Bit" status can be utilized in the generation of the ER bit in the device data channel query byte. In yet another aspect, "Device Ready To Receive Data" status can be utilized in the generation of the control necessary to interface with the data channel input message buffer. In still another aspect, HostDisconnect status can be utilized to determine if a serial link (e.g., a USB cable) is connected or disconnected. The serial link (e.g., communication link 120, such as a USB cable) connectivity state can be presented to a card inserted interface, used to reset a terminal adapter device (e.g., device 110) or module, and re-initialize the PHY interface 620 in preparation for re-establishing communication among a terminal adapter device and a peripheral adapter device in response to reconnection of the serial link.

A peripheral adapter device embodied in the exemplary embodiment 650 can be externally sourced via a 6.75 MHz clock and a 27 MHz clock. Clock signals in the exemplary embodiment 650 can be logically partitioned into four clock domains: a system clock domain, a transport input clock domain, a transport output clock domain and a data channel clock domain. A source for the system clock domain can be a 60 MHz PHY input clock signal (not shown). A source for the transport input clock domain can be a 27 MHz input clock signal provided by the 27 MHz clock. Such signal is illustrated with an arrow labeled "C" and incoming into the transport interface 655. A source of the transport output clock domain source can be provided by the 27 MHz clock. Such signal is illustrated with an arrow labeled "C" and outgoing from the transport interface 655. A source of the data channel clock domain can be the 6.75 MHz externally sourced clock. In one aspect, a system control unit (not shown) comprising the CI Reset unit 685 can supply (e.g., transmit) the 27 MHz external clock to a transport output clock of the transport interface 655. In another aspect, the system control unit can supply a 6.75 MHz external clock to a DC/EDC output clock of the data channel interface 675. Other clock signals at different frequencies also can be supplied.

As illustrated, the exemplary embodiment 650 can comprise a CI_reset unit 685 (also referred to as CI Reset 685). The CI reset 685 can supply a CI RST signal and can reset transport functions and data channel functions of a peripheral adapter device embodied in the exemplary embodiment 650. In one aspect, such peripheral adapter device can have reset asynchronously asserted and synchronously de-asserted to the system clock domain, the transport input clock domain, the transport output clock domain, and the data channel clock domain. The system control unit (not shown) can receive a CI reset state from the PHY interface 665 for generation of CI RST signal. As illustrated, various serial (e.g. USB 2.0 or ULPI+) interface signals can be received at and/or transmitted from the PHY interface 665. In one aspect, data signal (labeled "DATA") can comprise bi-directional traffic received and transmitted via a multi-bit (e.g., 8-bit) bus, such as an implementation of bus 412. In another aspect, three control signals can be associated with the PHY interface 665: (i) an incoming signal, labeled "DIR", that can be asserted (e.g., asserted high) by the PHY interface 665 to control the data bus and determine direction thereof; (ii) an incoming signal, labeled "NXT", that can be driven high to signal the data bus is to be throttled; and (iii) an outgoing signal that can be driven high to signal the end of a data stream transmitted to the PHY interface 665, or signal a request for data bus access.

The transport interface 655 can receive device transport packets from a peripheral device (e.g., peripheral device 170) functionally connected to a peripheral adapter device embodied in the exemplary embodiment 650. The transport interface 655 can transmit device transport packets to a memory 660 which can comprise or can embody a transport input packet buffer. The transport interface 655 can clock in device transport packets on the rising edge of the transport input clock signal.

In addition or in the alternative, the transport interface 655 can receive host transport packets from memory 662 which can comprise or can embody a transport output packet buffer. The transport interface 655 can send host transport packets to a peripheral device. A host transport packet can be transmitted as a multi-bit signal (e.g., an 8-bit signal) represented in FIG. 6B with an outgoing arrow labeled "Data". The transport interface can clock out host transport packets on the rising edge of the transport output clock.

The memory 660 (e.g., a transport input packet buffer) can receive device transport packets from the transport interface 655. The memory 660 (e.g., a transport input packet buffer) can monitor the start pulse to detect and discard short packets. In one implementation, for example, the memory 660 (e.g., the transport input packet buffer) can be configured to buffer eight device transport packets, and the memory can be embodied in a 2 KB FIFO buffer. The memory 660 can be written in the transport input clock domain and can be read in the system clock domain.

In one aspect, the memory 660 (e.g., the transport input packet buffer) can signal the PHY interface 665 upon or after a device transport packet is available. In another aspect, the memory 660 (e.g., a transport input packet buffer) can be signaled by the PHY interface 665 to transmit a device transport packet during a USB transmit timeslot. In one aspect, the PHY interface 665 can flow control a device transport packet on a byte basis.

The memory 662 (e.g., a transport output packet buffer) can be signaled by the PHY interface 665 when (e.g., upon or after) a host transport packet is available during a USB receive timeslot of the PHY interface 665. In one implementation, the PHY interface 665 can flow control the host transport packet on a byte basis. In another implementation, the memory 662 (e.g., the transport output packet buffer) can receive RxError status and reference data (e.g., CRC-16) error status from the PHY interface 665 during the USB receive timeslot of the PHY interface 665 when the USB receive timeslot contains a host transport packet. The memory 662 (e.g., the transport output packet buffer) can discard host transport packets having an RxError or a reference data error.

In certain implementations, the memory 662 (e.g., transport output packet buffer) can be configured to buffer eight host transport packets. The memory 662 can be embody or can be comprise a 2 KB FIFO buffer. The memory 662 can be written in the system clock domain and can be read in the transport output clock domain.

As illustrated, the exemplary embodiment 650 comprises a DC/EDC interface 675. In certain implementations, the DC/EDC 675 can be a host data channel interface. The DC/EDC interface 675 can receive device DC/EDC messages (e.g., DC/EDC message(s) 681) from a peripheral device functionally coupled to a peripheral adapter device embodied in the exemplary embodiment 650. The DC/EDC interface 675 can transmit DC/EDC messages to a memory 680 which can comprise or embody a data channel input message buffer. The DC/EDC interface 675 can clock in device DC/EDC messages on the rising edge of the data channel clock signal. The DC/EDC interface 675 can receive host data channel messages from memory 682 (e.g., data channel output message buffer) and can transmit host data channel messages to a peripheral device. The DC/EDC interface 675 can clock out a host data channel message on the falling edge of the data channel clock signal.

The memory 680 (e.g., data channel input message buffer) can receive device data channel messages from the DC/EDC interface 675. In one aspect, the memory 680 (e.g., data channel input message buffer) can signal the DC/EDC interface 675 when (e.g., upon or after) the memory 680 is ready to receive data. In certain implementations, for example, the memory 680 (e.g., data channel input message buffer) can be configured to buffer one device data channel message with up to 4 KB of data and length and status information of the device data channel message. The memory 680 can be written in the data channel clock domain and can be read in the system clock domain.

The memory 680 (e.g., the data channel input message buffer) can signal the PHY interface 665 when (e.g., upon or after) a complete device data channel message is available. In addition or in the alternative, the memory 680 can be signaled by the PHY interface 665 to transmit a device message segment during a USB transmit timeslot of such interface. In certain scenarios, the PHY interface 665 can flow control the device message segment on a byte basis.

Similarly, the memory 682 (e.g., data channel output message buffer) can be signaled by the PHY interface 665 that a host message segment is available during a USB receive timeslot of such interface. In one implementation, the PHY interface 665 can flow control the host message segment on a byte basis. In one aspect, the memory 682 (the data channel output message buffer) can receive RxError status and reference data (e.g., CRC-16) error status from the PHY interface 665 during a USB receive timeslot of such interface when (e.g., upon or after) the USB receive timeslot contains a host message segment. The memory 682 can discard a host data channel message having an RxError or a reference data error.

In certain implementations, the memory 682 (data channel output message buffer) can be configured to buffer one host data channel message with up to 4 KB of data and length and status information of the host data channel message. The memory 682 can signal the PHY interface when (e.g., upon or after) the data channel output message buffer is ready to receive data. The memory 682 can be written in the system clock domain and can be read in the data channel clock domain. The data channel output message buffer will send host data channel messages to the data channel interface. The data channel output message buffer will inform the data channel interface when a complete host data channel message is available.

In exemplary embodiment 650, the PHY interface 665 can route data and control between the USB PHY (e.g., interface 576) and the transport, data channel, and reset functions of a peripheral adapter device (e.g., device 130) embodied in or comprising the exemplary embodiment 650. The PHY interface 665 can initialize the USB PHY for USB synchronous, hi-speed device operation at initialization time. In response to USB PHY initialization, the PHY interface 665 can establish communication with a terminal adapter device when (e.g., upon or after) the terminal adapter device is connected to a peripheral adapter device. In one aspect, USB synchronous, hi-speed communication will be established between the peripheral adapter device and the terminal adapter device with the "USB TimeSlot Connection". The PHY interface 665 can generate (e.g., assemble) transport transmit messages. In one aspect, the PHY interface 665 can generate a data ID (e.g., information in TX CMD field) and reference data can be CRC information (e.g., CRC-16) field of transport transmit messages. In another aspect, the PHY interface 665 can generate transport transmit messages with device transport packets (e.g., traffic packets) when a device transport packet is available and with null data when (e.g., upon or after) a device transport packet is not available.

The PHY interface 665 can generate (e.g., assemble) data transmit messages. In one aspect, the PHY interface 665 can generate TX CMD and CRC-16 fields of data transmit messages. In another aspect, the PHY interface 665 can generate a data transmit message with device data channel message data when a device data channel message is available and with dummy data when a device data channel message is not available. In yet another aspect, the PHY interface 665 can add the state of a query byte ER bit, in an M-Card, into the "Set Query Byte Error Bit" field of the status byte in some or all data transmit messages. In still another aspect, the PHY interface 665 can insert the state of the data channel output message buffer's readiness to receive data into the "Device Is Ready To Receive Data" field of the status byte in some or all data transmit messages.

The PHY interface 665 can receive (e.g., decode, disassemble) transport receive messages. In addition, the PHY interface 665 can transmit received host transport packets to the memory 662 (e.g., the transport output packet buffer). Similarly, the PHY interface 665 can receive (e.g., decode or disassemble) data receive messages. In addition, the PHY interface 665 can transmit received host message segments to the data channel output message buffer.

The PHY interface 655 can monitor information (e.g., data messages, transport messages, or the like) for status of various quantities related to communication in accordance with the non-standard USB protocol described herein. For example, similarly to the PHY interface 620, the PHY interface 655 can monitor one or more of PID Error, RxError, CRC-16 Error, Host Query Byte Error Bit, Host Is Ready To Receive Data, CI Reset To M-Card, HostDisconnect, and VbusValid.

In one aspect, the PID Error can be either a PID check field not the one's complement of the PID field or a received non-defined PID. The PHY interface can discard serial receive messages having a PID Error. In another aspect, the RxError and/or CRC-16 error status can be transmitted to the memory 662 and/or memory 682 in order to discard host transport packets and host data channel messages having errors. In yet another aspect, the "Host Is Query Byte Error Bit" status can be utilized in the generation of an ER bit in the host data channel query byte. In still another aspect, "Host Is Ready To Receive Data" status can be utilized in generation of control signal necessary to interface to the memory 680 (e.g., a data channel input message buffer). In other aspect, "CI Reset To M-Card" status can be utilized in the generation of a CI RST signal. In another aspect, the VbusValid status can be utilized, for example, to determine if a serial link, such as a USB cable, is connected or disconnected. In one scenario, the USB cable connectivity state can be employed to reset the module embodied by exemplary embodiment 650 and re-initialize a USB PHY (e.g., PHY 576) functionally coupled thereto in preparation for re-establishing communication between a peripheral adapter device and a terminal adapter device in response to the serial link being reconnected.

Figure 7:
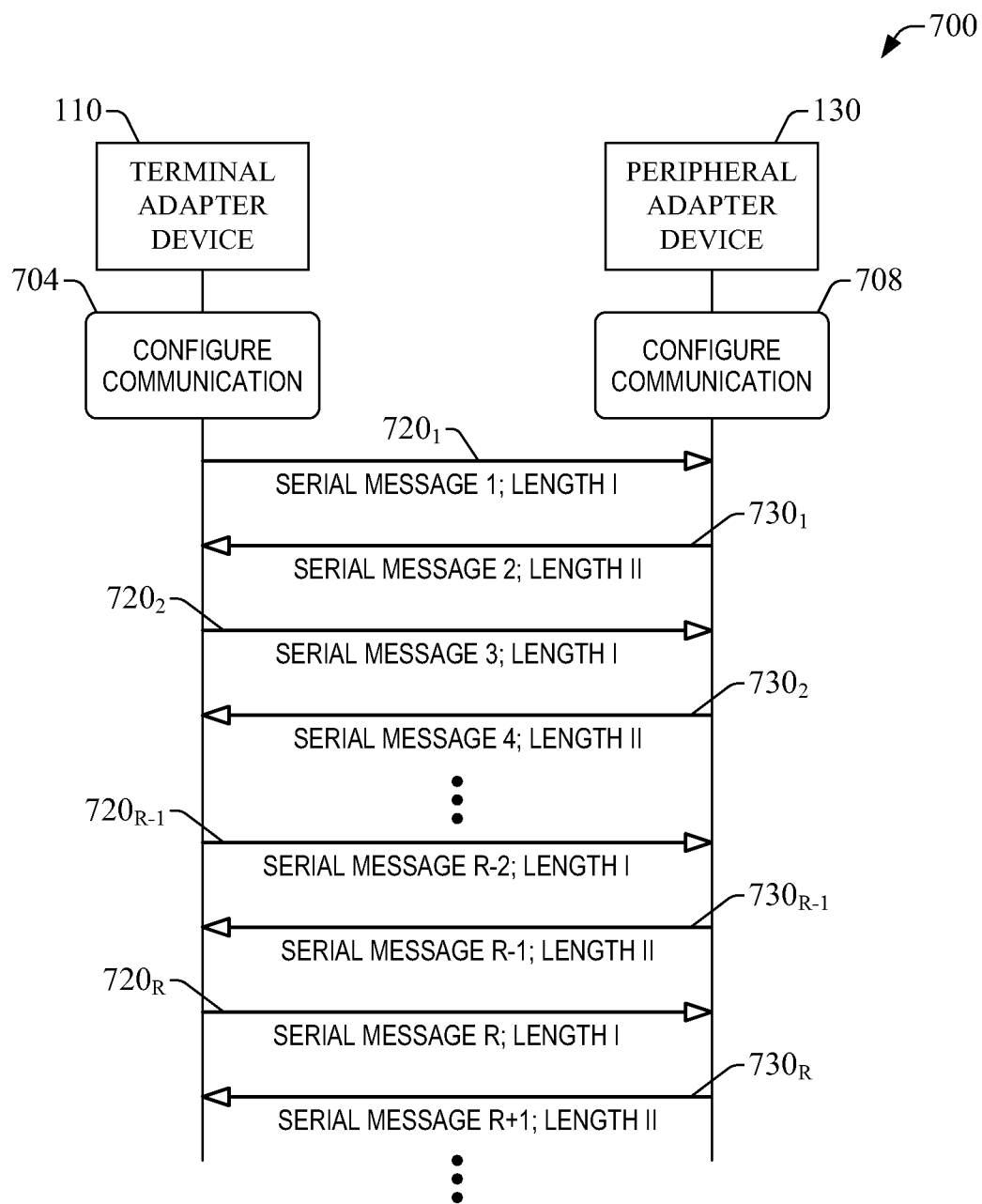
FIGS. 7-9 illustrate call flows of exemplary methods in accordance with at least certain aspects of the disclosure.
Figure 8:
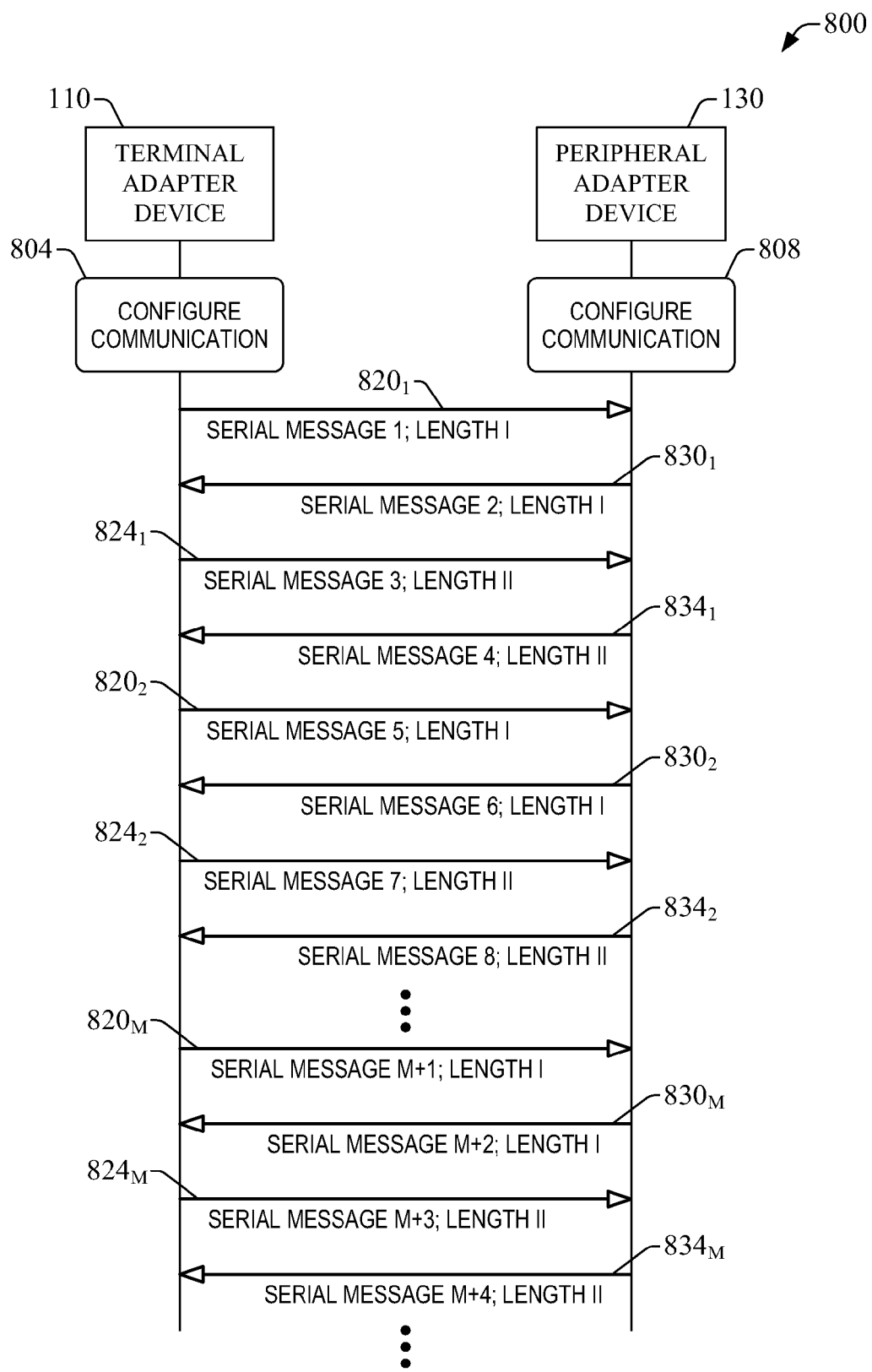
Figure 9:
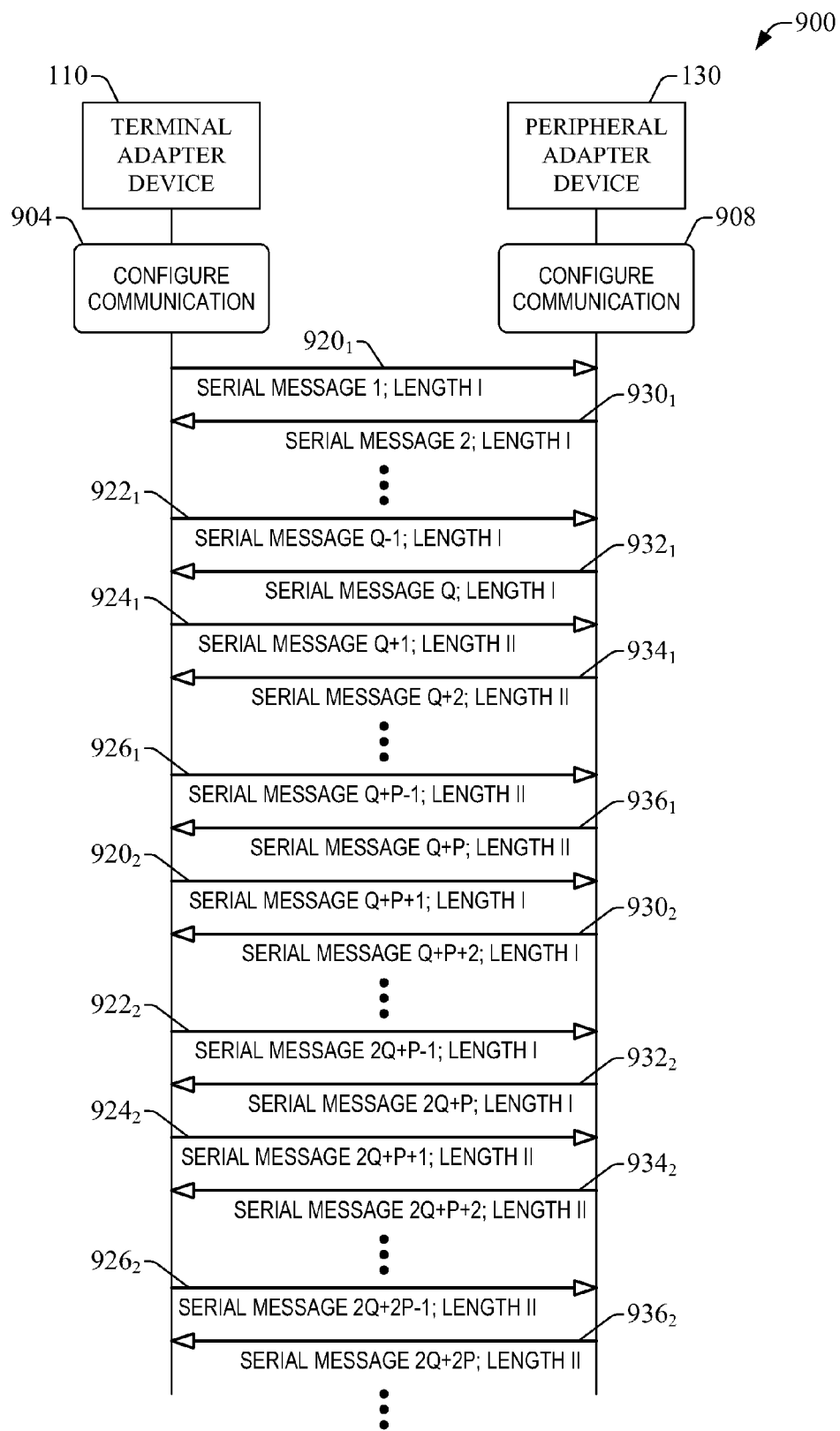
Figure 10:
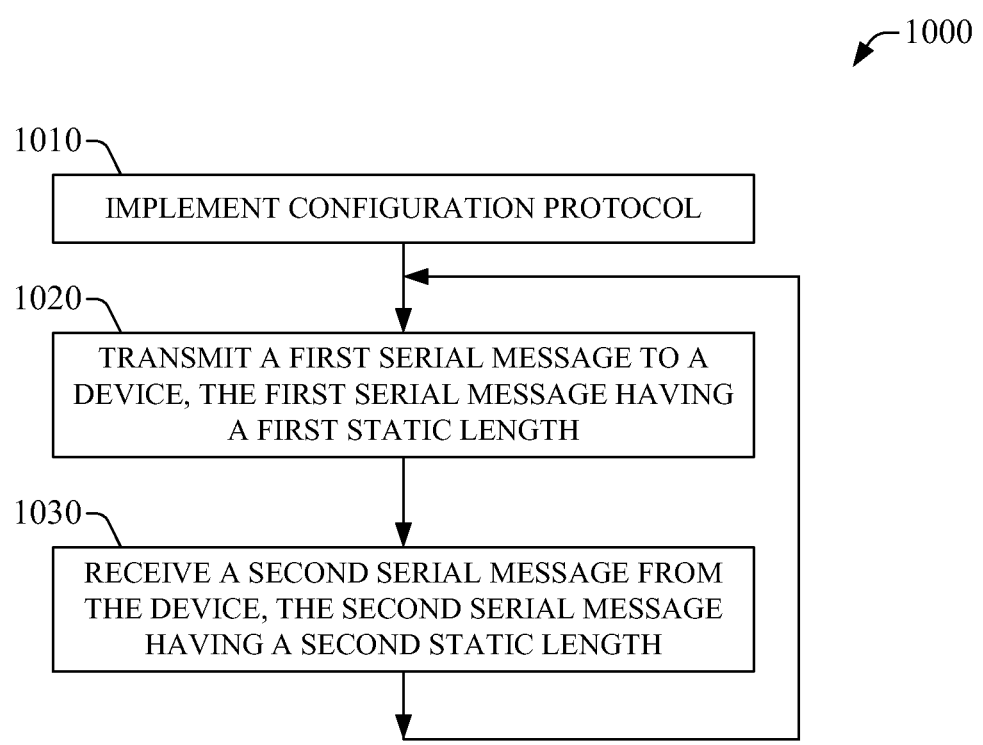
FIGS. 10-12 illustrate flowcharts of exemplary methods in accordance with at least certain aspects of the disclosure.
Figure 11:
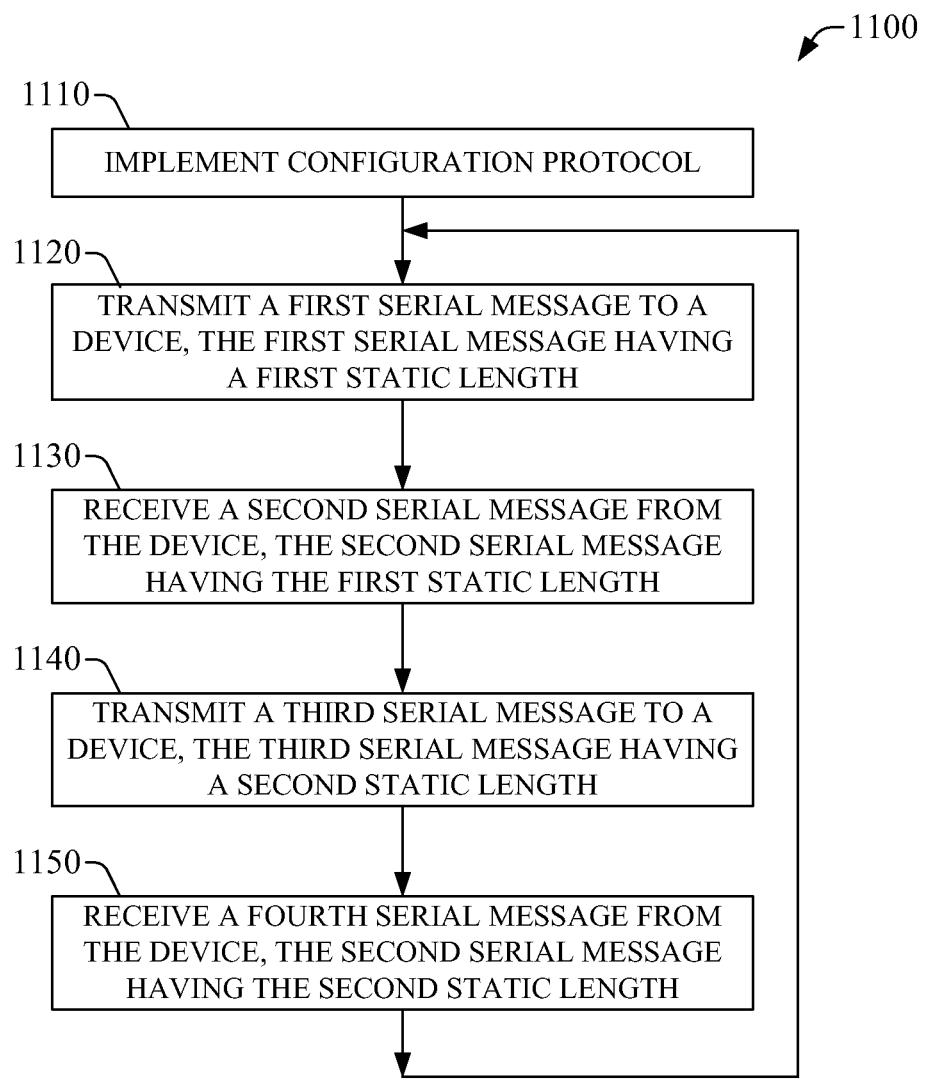
Figure 12:
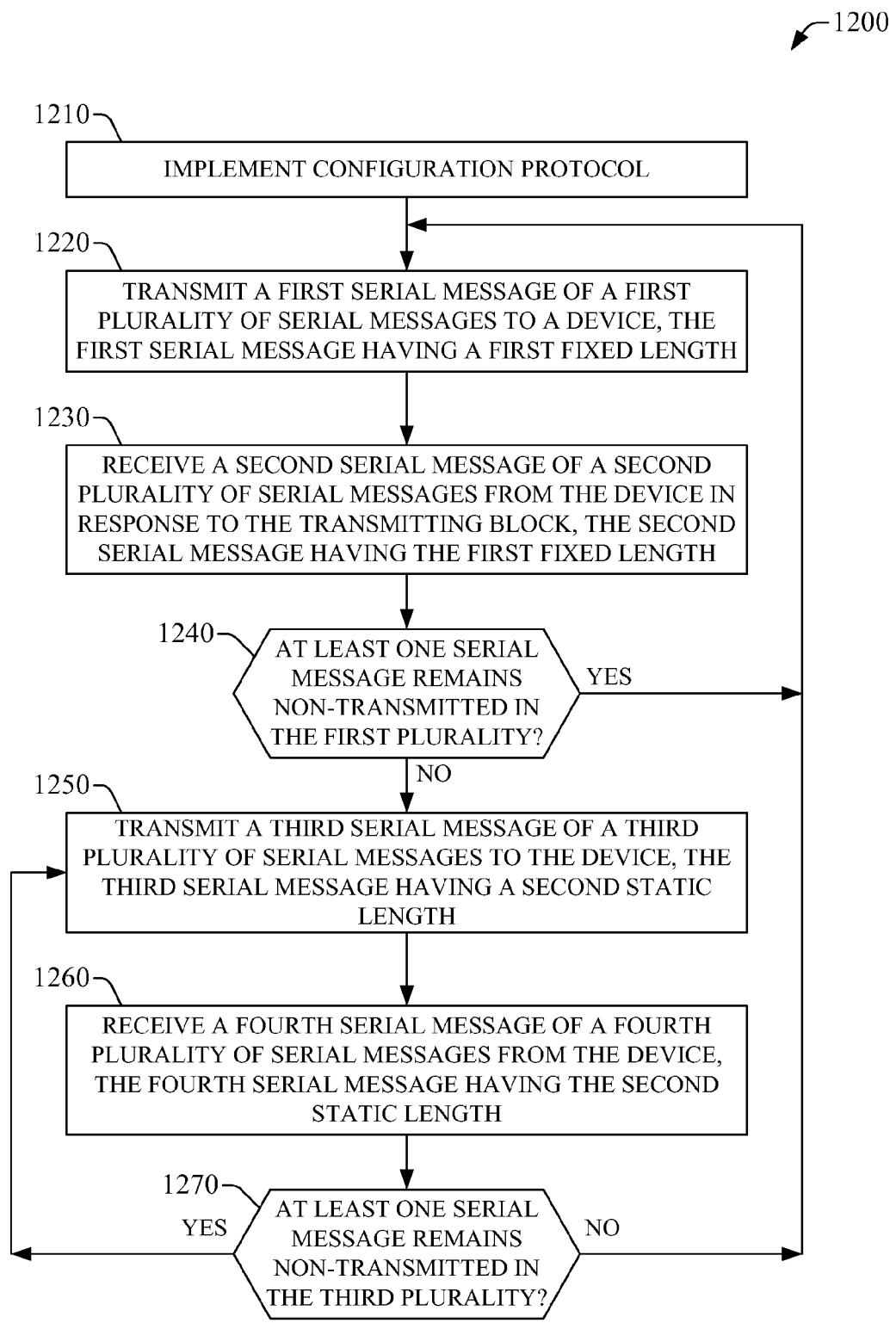

In view of the various aspects of the disclosed non-standard serial protocol for communication of information (e.g., data, signaling, or both), exemplary methods that can be implemented in accordance with the disclosure can be better appreciated with reference to the exemplary call flows in FIGS. 7-9 and flowcharts in FIGS. 10-12. For simplicity of explanation, the exemplary methods disclosed herein are presented and described as a series of actions (also referred to as steps), pictorially represented with a block. However, it is to be understood and appreciated that implementation, and related advantages, of such methods is not limited by the order of actions, as some actions may occur in different orders and/or concurrently with other actions from that shown and described herein. For example, the various methods (also referred to as processes) of the disclosure can be alternatively represented as a series of interrelated states or events, such as in a state diagram. As illustrated, when disparate functional elements (adapter devices, units, etc.) implement different portions of the methods of the disclosure, an interaction diagram or a call flow can represent such methods or processes. Furthermore, not all illustrated actions may be required to implement a method in accordance with the subject disclosure.

The methods disclosed throughout the subject specification and annexed drawings can be stored on an article of manufacture, or computer-readable storage medium, to facilitate transporting and transferring such methods to computing devices (e.g., desktop computers, mobile computers, mobile telephones, and the like) for execution, and thus implementation, by a processor or for storage in a memory.

FIGS. 7-9 illustrate call flows of exemplary methods for implementing a non-standard serial protocol (e.g., a non-standard USB protocol) in accordance with at least certain aspects of the disclosure. Regarding call flow 700, at block 704, terminal adapter device 110 can configure communication. Similarly, at block 708, peripheral adapter device 130 can configure communication. In one aspect, configuring communication can include configuring message type, message structure (e.g., number and type of logical block(s), block size(s), or the like) or number of messages in a communication sequence, or any combination of the foregoing. At $720_1$, terminal adapter 110 can transmit a serial message 1 having length I. In one embodiment, the serial message 1 can be a Transport Data Message having a length of 203 bytes. In response, at $720_2$, peripheral adapter device 130 can transmit a serial message 2 having length II. In such embodiment, the serial message 2 can be a Data Channel Data Message having a length of 20 bytes. Serial message 1 and serial message 2 form a two-message sequence, or two-message communication cycle, which can be repeated. In particular, in response to reception of serial message 2, terminal adapter device 110 can transmit serial message 3 at $720_2$. Such message can have length equal to length I. In one aspect, serial message 3 can be a Transport Data Message having a length of 203 bytes. In response to reception of such message, at $730_2$, peripheral adapter device 130 can transmit a serial message 4 having length II. Serial message 3 and serial message 4 form another two-message communication cycle. In another aspect, the serial message 4 can be a Data Channel Data Message having a length of 20 bytes. As illustrated, terminal adapter 110 and peripheral adapter device 130 can implement a continuous or substantially continuous reiteration of communication (e.g., exchange) of additional two-message sequences. For instance, as part of such repetition, at $720_{R-1}$, terminal adapter device 110 can transmit a serial message R−2 having length I and, in response, at $730_{R-1}$, peripheral adapter device 130 can transmit a serial message R−1 having length II. Such a two-message communication cycle, can be followed by serial message R having length I, transmitted by terminal adapter device 110, and serial message R+1 having length II, which is transmitted by peripheral adapter device 130 at $720_R$, in response to reception of serial message R. Here, R is a natural number greater than unity.

Regarding call flow 800, block 804 and block 808 are substantially the same as blocks 704 and 708, respectively. Such configuration can result in terminal adapter device 110 and the peripheral adapter device 130 being configured to exchange at least one four-message sequence. Accordingly, terminal adapter device 110 can be configured to transmit two serial messages to the peripheral adapter device 130 and receive, in response, two other serial messages from the peripheral adapter device 130. The terminal adapter 110 can transmit the two serial messages alternately to reception of the two other serial messages. In a counterpart aspect, as a result of configuration of communication, peripheral adapter device 130 can be configured to receive two serial messages and transmit, in response, two serial messages as part of the single four-message message sequence.

At $820_1$, terminal adapter 110 can transmit a serial message 1 having length I. In one embodiment, the serial message 1 can be a Transport Data Message having a length of 203 bytes. In response, at $830_1$, peripheral adapter device 130 can transmit a serial message 2 having length I. In such embodiment, the serial message 2 can be a Transport Data Message having a length of 203 bytes. At $824_1$, the terminal adapter 110 can transmit a serial message 3 having length II and, in response, the peripheral adapter device 130 can transmit a serial message 4, having length II, at $834_1$. In one embodiment, the serial message 3 and the serial message 4 can be Data Channel Data Messages having a length of 20 bytes. Serial message 1, serial message 2, serial message 3, and serial message 4 form the four-message sequence, or four-message communication cycle, which can be repeated. In particular, in response to reception of serial message 4, terminal adapter device 110 can transmit serial message 5 at $820_2$. Such message can have length equal to length I. In one aspect, serial message 5 can be a Transport Data Message having a length of 203 bytes. In response to reception of such message, at $830_2$, peripheral adapter device 130 can transmit a serial message 6 having length II. At $824_2$, the terminal adapter 110 can transmit serial message 7 having length II and, in response, the peripheral adapter device 130 can transmit serial message 8 having length II, at $834_2$. In another aspect, the serial message 7 and the serial message 8 can be Data Channel Data Messages having a length of 20 bytes. Serial message 5, serial message 6, serial message 7, and serial message 8 form another four-message sequence. As illustrated, terminal adapter 110 and peripheral adapter device 130 can implement a continuous or substantially continuous reiteration of communication (e.g., exchange) of additional four-message sequences. For instance, as part of such repetition, at $820_M$, terminal adapter device 110 can transmit a serial message M+1 having length I and, in response, at $830_M$, peripheral adapter device 130 can transmit a serial message M+1 having length I. At $824_M$, the terminal adapter device 110 can transmit a serial message M+3 and, in response, the peripheral adapter device 130 can transmit a serial message M+4, having length II, at $834_M$. Such four-message communication cycle, can be followed by other four-message communication cycles. Here, M is a natural number greater than unity.

As illustrated in exemplary method 900, implementing the non-standard USB protocol of the disclosure can comprise reiterating exchange of (A) a first plurality of serial messages, with each message of such plurality having a first static length, and (B) a second plurality of serial messages, with each message of such plurality having a second static length. In one aspect, the first plurality of messages can include Q serial messages having length I, wherein Q is a natural number greater than 2. In another aspect, the second plurality of messages can include P serial messages having length II, where P is a natural number greater than 2. In one aspect, the plurality of Q+P serial messages that arise from combination of the first plurality of serial messages and the second plurality of serial messages forms a multi-message sequence, or multi-message communication cycle. In the illustrated scenario, at $920_1$, the terminal adapter device 110 can transmit serial message 1 having length I and, in response, the peripheral adapter device 130 can transmit serial message 2, having length I, at $930_1$. Terminal adapter device 110 and peripheral adapter device 130 exchange additional serial messages that are part of the first plurality of serial messages. In particular, at $922_1$, the terminal adapter device 110 transmits a serial message Q−1 to peripheral adapter device 130, which in response transmits serial message Q, having length I, at $932_1$. Subsequent to exchange of the first plurality of serial messages, the terminal adapter device 110 and the peripheral adapter device 130 can exchange the second plurality of serial messages. At $924_1$, the terminal adapter device 110 can transmit serial message Q+1 having length II and, in response, the peripheral adapter device 130 can transmit serial message Q+2, having length II, at $934_1$. The terminal adapter device 110 and the peripheral adapter device 130 can continue to exchange serial messages that are part of the second plurality of serial messages and, for example, at $926_1$, the terminal adapter device 110 can transmit serial message Q+P−1 and, in response, the peripheral adapter device 130 can transmit serial message Q+P, having length II, at $936_1$.

Upon or after transmission of serial message Q+P, another multi-message communication cycle can be implemented, wherein a plurality of Q serial messages, each one having length I, and a plurality of P serial message, each one having length II, can be exchanged among the terminal device 110 and the peripheral adapter device 130. At $920_2$, the terminal adapter device 110 can transmit serial message Q+P+1 having length I and, in response, the peripheral adapter device 130 can transmit serial message Q+P+2, having length I, at $930_2$. Serial exchange of other serial messages among the terminal adapter device 110 and the peripheral adapter device 130 continues, each one of such serial messages having length I. As part of such exchange, at $922_1$, the terminal adapter device 110 can transmit a serial message 2Q+P−1 having length I and, in response, the peripheral adapter device 130 can transmit serial message 2Q+P, having length I, at $932_2$. At $924_2$, the terminal adapter device 110 can transmit serial message 2Q+P+1 having length II and, in response, the peripheral adapter device 130 can transmit serial message 2Q+P+2, having length II, at $934_2$. Further serial messages having length II are exchanged as part of communication of the second plurality of serial messages, where terminal adapter device 110 can transmit serial message 2Q+2P−1 having length II and, in response, the peripheral adapter device 130 can transmit serial message 2Q+2P, having length II, at $936_2$. In response to receiving serial message 2Q+2P, another multi-message (e.g., P+Q-message) communication cycle is initiated.

FIGS. 10-12 illustrate flowcharts of exemplary methods for implementing a non-standard serial protocol (e.g., a non-standard USB protocol) in accordance with at least certain aspects of the disclosure. The exemplary method 1000 can be implemented (e.g., performed or executed) by a device, such as terminal adapter device 110 or peripheral adapter device 130, in a serial interface (e.g., USB interface) described herein, or a processor that is part of or functionally coupled to the device. In certain embodiments, the serial interface can be embodied or comprised in the terminal adapter device 110, the communication link 120, and the peripheral adapter device 130.

At block 1010, a configuration protocol can be implemented. Implementing such protocol can include configuring one or more length sizes (e.g., block sizes) for respective types of serial messages to be transmitted as part of the non-standard serial protocol. In addition or in the alternative, implementing the configuration protocol can include configuring a number of serial messages that can be transmitted or received by the device that implements the exemplary method 1000. As described herein, to preserve bandwidth, the one or more length sizes can be static and specific to such types of serial message to be communicated. At block 1020, a first serial message can be transmitted to a destination device. Transmission associated with block 1020 can be implemented as point-to-point communication. In one aspect, the first serial message can have a first static length. The first serial message can be part of message sequence I or message sequence II (see, e.g., FIG. 1) depending at least on the device that implements the subject exemplary method 1000. At block 1030, a second serial message can be received from the destination device. The second serial message can be received as part of a point-to-point communication. In one aspect, the second serial message can have a second static length.

In the illustrated embodiment, after implementation of block 1030, flow of the exemplary method 1000 can be directed to block 1020, thus forming a communication loop for exchange of information (e.g., data) amongst the device and the destination device. The communication loop can ensure a guaranteed bandwidth determined by the first static length and the second static length. In certain embodiments, the exemplary method 1000 can include a block (not shown) for regulating the duration of the communication loop by applying at least one rule to determine if flow is to be directed to block 1020 after implementation of block 1030.

Regarding exemplary method 1100, blocks 1110 and 1120 are substantially the same as blocks 1010 and 1020, respectively. At block 1130, a second serial message can be received from a destination device. In one aspect, the second serial message can have a first static length, which is the same the length as that of the first serial message transmitted at block 1120. At block 1140, a third serial message can be transmitted to a destination device. In one aspect, the third serial message can have a second static length. In one aspect, the second static length can be equal to the first static length. At block 1150, a fourth serial message can be received from the destination device. In one aspect, the fourth serial message can have the second static length.

In the illustrated embodiment, after or upon implementation of block 1150, flow of the exemplary method 1100 can be directed to block 1120, thus forming a communication loop for exchange of information (e.g., data and/or signaling) among the device that implements the subject exemplary method and the destination device. The communication loop that is formed has a fixed sequence of four serial messages, and can ensure a guaranteed bandwidth that is determined by the first static length and the second static length. In certain embodiments, the exemplary method 1000 can include a block (not shown) for regulating the duration (e.g., number of repetitions) of the communication loop by applying at least one rule to determine if flow is to be directed to block 1120 after or upon implementation of block 130.

Regarding exemplary method 1200, block 1210 is substantially the same as block 1110. Implementing the configuration protocol can include configuring one or more of a number of serial messages that can be transmitted or a number of serial messages that can be received by the device that implements the exemplary method 1000. At block 1220, a first serial message of a first plurality of serial messages can be transmitted to a destination device. The second serial message can have the first static length. The destination device is different from the device that can implement the subject exemplary method. At block 1230, a second serial message of a second plurality of serial messages can be received from the destination device in response to implementing block 1220. The second serial message can have the first static length. At block 1240 it can be determined if at least one serial message remains non-transmitted in the first plurality of serial messages. The number of members in such plurality can be configured at block 1210. In the affirmative case, flow is directed to block 1220. In the alternative, at act 1250, a third serial message of a third plurality of serial messages can be transmitted to the destination device. The third serial message can have a second static length. At block 1260, a fourth serial message of a fourth plurality of serial messages can be received from the destination device. The fourth serial message can have a second static length. At block 1270 it can be determined if at least one serial message remains non-transmitted in the second plurality of serial messages. The number of members in such plurality can be configured at block 1210. In the affirmative case, flow is directed to block 1250 and an additional cycle of transmission and reception can be implemented by performing blocks 1250 and 1260. In the alternative, at act 1250, a third serial message of a third plurality of serial messages can be transmitted to the destination device.

When compared to standard technologies for communication according to USB protocol, various advantages of the disclosure over such technologies emerge from the subject specification and annexed drawings. As an example, such embodiments can provide guaranteed bandwidth and latency with reduced complexity and cost with respect to available communication modes (e.g., isochronous mode) in standard USB protocol.

One or more embodiments of the subject disclosure can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the systems, apparatuses, and methods have been described in connection with exemplary embodiments and specific examples, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where a description of a protocol, procedure, process, or method does not actually recite an order to be followed by its acts or steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent that various modifications and variations can be made without departing from the scope or spirit of the subject disclosure. Other embodiments will be apparent from consideration of the specification and practice disclosed herein. It is intended that the specification and examples be considered as non-limiting illustrations only, with a true scope and spirit of the subject disclosure being indicated by the following claims.

What is claimed is:

1. A method comprising:
    transmitting, by a first device via a serial communication link, a first message to a second device, the first message having a first fixed length;
    receiving, at the first device via the serial communication link, a second message from the second device in response to transmitting the first message, the second message having the first fixed length;
    transmitting, by the first device via the serial communication link, a third message to the second device in response to receiving the second message, the third message having a second fixed length;
    receiving, at the first device via the serial communication link, a fourth message from the second device in response to transmitting the third message, the fourth message having the second fixed length; and
    performing, by the first device, a repeating cycle of transmitting an additional first message, receiving an additional second message in response to the additional first message, transmitting an additional third message in response to the additional second message, and receiving an additional fourth message in response to the additional third message wherein the repeating cycle is performed for communication between the first device and the second device thereby fulfilling a bandwidth requirement between the first device and the second device based on the first fixed length and the second fixed length.

2. The method of claim 1, wherein the repeating cycle is repeated according to a time period thereby fulfilling the bandwidth requirement during the time period.

3. The method of claim 1, wherein transmitting, by the first device via the serial communication link, the first message to the second device comprises transmitting, by the first device, a first transport message to the second device, the first transport message being part of the first message.

4. The method of claim 3, wherein receiving, at the first device via the serial communication link, the second message from the second device in response to transmitting the first message comprises receiving, at the first device, a second transport message from the second device, the second transport message being part of the second message.

5. The method of claim 3, wherein transmitting, by the first device via the serial communication link, the first message to the second device comprises:
    transmitting, as part of the first transport message, a data identifier, a message status identifier, payload data, and reference data, and wherein
    the data identifier indicates that the first transport message contains transport data or that the payload data is null.

6. The method of claim 4, wherein receiving, at the first device via the serial communication link, the second transport message from the second device comprises:
    receiving, as part of the second transport message, a data identifier, a message status identifier, payload data, and reference data, and wherein
    the data identifier indicates that the second transport message contains transport data or that the payload data is null.

7. The method of claim 4, wherein transmitting, by the first device via the serial communication link, the third message to the second device in response to receiving the second message comprises transmitting, by the first device, a first control message to the second device, the first control message being part of the third message.

8. The method of claim 7, wherein receiving, at the first device via the serial communication link, the fourth message from the second device in response to transmitting the third message comprises receiving, at the first device, a second control message from the second device, the second control message being part of the fourth message.

9. The method of claim 7, wherein transmitting, by the first device via the serial communication link, the first control message to the second device comprises transmitting, as part of the first control message, a data identifier, a message status identifier, payload data, and reference data, wherein
    the data identifier indicates that the first control message contains control data or the payload data is null, and further wherein
    the message status identifier conveys a common interface reset instruction, an indication that the first device is ready to receive data, and, in response to the data identifier indicating the first control message contains data, an indication of a type of the control data.

10. The method of claim 8, wherein receiving, at the first device via the serial communication link, the second control message from the second device comprises receiving, as part of the second control message, a data identifier, a message status identifier, payload data, and reference data, and wherein
the data identifier indicates that the second control message contains control data or that the payload data is null, and further wherein
the message status identifier conveys a common interface reset instruction, an indication that the second device is ready to receive data, and, in response to the data identifier indicating the second control message contains data, an indication of a type of the control data.

11. The method of claim 8, wherein receiving, at the first device via the serial communication link, the second control message from the second device comprises receiving 20 bytes of information as part of the second control message.

12. An apparatus, comprising:
a first device; and
a second device functionally coupled to the first device via a serial link,
the first device configured to:
transmit, via the serial link, a first message to the second device, the first message having a first fixed length, and
receive, via the serial link, a second message from the second device in response to transmission of the first message, the second message having the first fixed length, and
the second device configured to:
receive, via the serial link, the first message from the first device, and
transmit, via the serial link, the second message to the first device in response to reception of the first message,
the first device being further configured to transmit, via the serial link, a third message to the second device in response to receiving the second message, the third message having a second fixed length, and
the second device being further configured to transmit, via the serial link, a fourth message to the first device in response to the receiving the third message, the fourth message having the second fixed length,
wherein the first device and the second device are configured to communicate with each other via the serial link based on a repeating cycle of transmitting an additional first message from the first device to the second device, transmitting from the second device to the first device an additional second message in response to the additional first message, transmitting from the first device to the second device an additional third message in response to the additional second message, and transmitting from the second device to the first device an additional fourth message in response to the additional third message, wherein the repeating cycle is performed for communication between the first device and the second device thereby fulfilling a bandwidth requirement between the first device and the second device based on the first fixed length and the second fixed length.

13. The apparatus of claim 12, wherein the first fixed length is substantially the same as the second fixed length.

14. The apparatus of claim 12, wherein the first message comprises a first transport message having traffic or null data.

15. The apparatus of claim 12, wherein the second message comprises a second transport message having traffic or null data.

16. The apparatus of claim 12, wherein the second message comprises a data message having control data.

17. The apparatus of claim 12, wherein the serial link is a universal serial bus (USB) cable.

18. The method of claim 1, wherein the first message, the second message, the third message, and the fourth message are transmitted via a universal serial bus bulk transfer mode.

19. A system, comprising:
a memory comprising computer-executable instructions; and
a processor functionally coupled to the memory and configured, by the computer-executable instructions, to perform at least the following actions,
transmitting, via a serial communication link, a first message to a device, the first message having a first fixed length;
receiving, via the serial communication link, a second message from the device in response to transmitting the first message, the second message having the first fixed length;
transmitting, via the serial communication link, a third message to the device in response to receiving the second message, the third message having a second fixed length;
receiving, via the serial communication link, a fourth message from the device in response to transmitting the third message, the fourth message having the second fixed length; and
performing a repeating cycle of transmitting an additional first message, receiving an additional second message in response to the additional first message, transmitting an additional third message in response to the additional second message, and receiving an additional fourth message in response to the additional third message, wherein the repeating cycle is performed for communication with the device thereby fulfilling a bandwidth requirement for communication with the device based on the first fixed length and the second fixed length.

* * * * *